United States Patent
Babbitt et al.

(10) Patent No.: US 8,622,859 B2
(45) Date of Patent: Jan. 7, 2014

(54) SYSTEMS AND METHODS FOR HYBRIDIZATION OF A MOTOR VEHICLE USING HYDRAULIC COMPONENTS

(75) Inventors: Guy Robert Babbitt, Fort Collins, CO (US); Christopher Wayne Turner, Windsor, CO (US); Nicholas Paul Echter, Wheat Ridge, CO (US); James William Howland, Littleton, CO (US); James Mathew Quinlan, Atlanta, GA (US)

(73) Assignee: Czero Holding Company, LLC, Fort Collins, CO (US)

( * ) Notice: Subject to any disclaimer, the term of this patent is extended or adjusted under 35 U.S.C. 154(b) by 171 days.

(21) Appl. No.: 13/377,520

(22) PCT Filed: Jun. 10, 2010

(86) PCT No.: PCT/US2010/038237
§ 371 (c)(1),
(2), (4) Date: Dec. 9, 2011

(87) PCT Pub. No.: WO2010/144753
PCT Pub. Date: Dec. 16, 2010

(65) Prior Publication Data
US 2012/0077632 A1   Mar. 29, 2012

Related U.S. Application Data

(60) Provisional application No. 61/185,995, filed on Jun. 10, 2009, provisional application No. 61/185,982, filed on Jun. 10, 2009, provisional application No. 61/242,333, filed on Sep. 14, 2009.

(51) Int. Cl.
*F16H 3/72*   (2006.01)
*F16H 47/04*   (2006.01)

(52) U.S. Cl.
USPC .............................................. 475/1; 475/72

(58) Field of Classification Search
CPC . F16H 3/72; F16H 2047/04; F16H 2045/005; F16H 47/04; B60K 6/365
USPC .......................................................... 475/1, 72
See application file for complete search history.

(56) References Cited

U.S. PATENT DOCUMENTS

| 3,969,958 A | 7/1976 | Miyao et al. |
| 3,982,448 A | 9/1976 | Polak et al. |

(Continued)

FOREIGN PATENT DOCUMENTS

| EP | 0552140 B1 | 7/1993 |
| EP | 0769404 B1 | 4/1997 |

(Continued)

OTHER PUBLICATIONS

International Search Report and Written Opinion issued in PCT/US2010/038237, mailed Aug. 12, 2010, 12 pages.

*Primary Examiner* — Edwin A Young
(74) *Attorney, Agent, or Firm* — Faegre Baker Daniels LLP

(57) ABSTRACT

A system for hydraulic hybridization of a motor vehicle according to embodiments of the present invention includes a planetary gear mechanism including a first, second, and third planetary member and planet gears, wherein one of the first, second, and third planetary members is a sun gear, one is a ring gear, and one is a carrier; an engine, the engine including a crank shaft; a transmission, the transmission including a transmission input shaft; and a hydraulic pump/motor, the pump/motor including a pump shaft; and wherein the first planetary member is mechanically coupled to the pump shaft, wherein the second planetary member is mechanically coupled to the crank shaft, wherein the third planetary member is mechanically coupled to the transmission input shaft, and wherein the hydraulic pump/motor is not part of a hydrostatic transmission system.

27 Claims, 22 Drawing Sheets

(56) References Cited

U.S. PATENT DOCUMENTS

| | | |
|---|---|---|
| 5,120,282 A | 6/1992 | Fjallstrom |
| 5,165,233 A | 11/1992 | Betz |
| 5,258,651 A | 11/1993 | Sherman |
| 5,285,111 A | 2/1994 | Sherman |
| 5,415,603 A | 5/1995 | Tuzuki et al. |
| 5,492,189 A | 2/1996 | Kriegler et al. |
| 5,637,987 A | 6/1997 | Fattic et al. |
| 5,794,734 A | 8/1998 | Fahl et al. |
| 5,847,470 A | 12/1998 | Mitchell |
| 5,856,709 A | 1/1999 | Ibaraki et al. |
| 5,895,333 A | 4/1999 | Morisawa et al. |
| 6,170,587 B1 * | 1/2001 | Bullock ............ 180/69.6 |
| 6,805,648 B1 | 10/2004 | Ehrlinger |
| 6,964,627 B2 | 11/2005 | Ai et al. |
| 7,000,717 B2 | 2/2006 | Ai et al. |
| 7,273,122 B2 | 9/2007 | Rose |
| 7,302,875 B2 | 12/2007 | Fukuchi |
| 7,322,899 B1 | 1/2008 | Long et al. |
| 7,337,869 B2 | 3/2008 | Gray, Jr. et al. |
| 7,357,744 B2 | 4/2008 | Dyck et al. |
| 7,537,075 B2 | 5/2009 | Gray, Jr. et al. |
| 7,588,509 B1 | 9/2009 | Marsha |
| 7,637,336 B2 | 12/2009 | Enomoto et al. |
| 7,690,450 B2 | 4/2010 | Knestrick et al. |
| 7,725,222 B2 * | 5/2010 | Endo et al. ............ 701/22 |
| 7,901,314 B2 * | 3/2011 | Salvaire et al. ......... 475/72 |
| 2003/0186768 A1 * | 10/2003 | Evans et al. ............ 475/1 |
| 2004/0251067 A1 | 12/2004 | Gray, Jr. et al. |
| 2006/0068970 A1 | 3/2006 | Rose |
| 2006/0231339 A1 | 10/2006 | Enomoto et al. |
| 2007/0126284 A1 | 6/2007 | Swain et al. |
| 2007/0278027 A1 | 12/2007 | Gray, Jr. et al. |
| 2008/0200301 A1 | 8/2008 | Shimizu et al. |
| 2008/0207375 A1 | 8/2008 | Shimizu et al. |
| 2008/0314039 A1 | 12/2008 | Gray, Jr. et al. |
| 2009/0118935 A1 | 5/2009 | Heap et al. |
| 2009/0120388 A1 | 5/2009 | Lee et al. |
| 2009/0247353 A1 | 10/2009 | Tryon et al. |
| 2009/0247355 A1 | 10/2009 | Tryon et al. |
| 2009/0253551 A1 | 10/2009 | Foster |
| 2009/0313984 A1 | 12/2009 | Mustafa |
| 2010/0064675 A1 | 3/2010 | Mustafa |
| 2010/0093477 A1 | 4/2010 | Foster et al. |
| 2010/0133031 A1 | 6/2010 | Mendler |

FOREIGN PATENT DOCUMENTS

| | | |
|---|---|---|
| WO | WO2005075233 A2 | 8/2005 |
| WO | WO2006038968 A1 | 4/2006 |
| WO | WO2008133805 A2 | 11/2008 |
| WO | WO2008153670 A2 | 12/2008 |
| WO | WO2009158059 A1 | 12/2009 |
| WO | WO2013083458 A1 | 6/2013 |
| WO | WO2013130142 A1 | 9/2013 |

* cited by examiner

|  | 2007 | 2008 | 2010 | 2011 | Pump/Motor |
|---|---|---|---|---|---|
| Launch | X |  |  |  | Pump |
| Low | X | X |  |  | Off |
| Medium |  | X | X |  | Either |
| Direct Drive |  | X |  | X | Either |

| Mode | C1 (1510) | C2 (1515) |
|---|---|---|
| Torque Multiplication | X | |
| Direct Drive | | X |
| Disengaged | | |

| Mode | C3 (1610) | OWC | C4 (1615) |
|---|---|---|---|
| Torque Multiplication | X | X | |
| Preapre to Shift to direct drive | | X | |
| Direct Drive | | | X |
| Disengaged | | | |

6101  6102

SYSTEMS AND METHODS FOR HYBRIDIZATION OF A MOTOR VEHICLE USING HYDRAULIC COMPONENTS

CROSS-REFERENCE TO RELATED APPLICATIONS

This application claims the benefit of U.S. Provisional Patent Application Ser. No. 61/185,982, filed on Jun. 10, 2009, and of U.S. Provisional Patent Application Ser. No. 61/185,995, filed on Jun. 10, 2009, and of U.S. Provisional Patent Application Ser. No. 61/242,333, filed on Sep. 14, 2009. The aforementioned applications are incorporated herein by reference in their entirety for all purposes.

FIELD

Embodiments of the present invention relate generally to systems and methods for hydraulic hybrid vehicles, and more specifically to hydraulic hybrid systems that utilize a planetary gear train to replace a torque converter and couple a hydraulic pump/motor to the output of a prime mover and input of a transmission.

BACKGROUND

Rising fuel costs and concern for the environment are providing more and more incentive for automobile and heavy duty vehicle manufacturers to increase the fuel economy of the vehicles they produce. New vehicles are including new and improved technologies that continue to reduce the amount of fuel used per mile driven. One such technology is the hybridization of vehicles in which two or more power sources are used in various combinations to propel the vehicle.

Depending on the exact method of hybridization of a vehicle the fuel savings may be realized from one or more of the following: optimizing the operating speed and load point at which the prime mover or engine operates, recovering braking energy normally lost to heat, increasing the efficiency of the powertrain, enabling stop-start operation, and by allowing for engine downsizing.

Electric hybrids utilize an internal combustion engine in combination with one or more electric motors. Similarly, hydraulic hybrids utilize hydraulic pumps and motors as a second source of power and store the energy as pressurized fluid in accumulators. Hydraulic systems have higher power density than electric systems, making hydraulics ideally suited for vehicles intended to recover large amounts of braking energy. Typical examples of vehicles that could benefit from hydraulic hybrids include refuse trucks, delivery vehicles, or other vehicles that undergo frequent stopping and starting.

Researchers and suppliers have been developing both parallel and series hydraulic hybrid systems for some time, but many of the limitations of these systems have yet to be overcome. Parallel hybrid systems can typically be characterized as simpler systems that rely largely on regenerative braking to generate a majority of the fuel savings, which tends to be considerably less than those achieved with series systems. Series systems tend to be more complicated, cost more as a retrofit, but save larger amounts of fuel largely due to their ability to decouple the engine load from the required driving load. Finally, series hydraulic hybrid systems tend to be more difficult to make financially viable for retrofit applications due to the large amount of hardware needed for the system.

Most parallel hydraulic hybrid systems are installed in the driveline downstream of the transmission resulting in multiple disadvantages. The first disadvantage is that by locating the pump/motor downstream of the transmission the pump/motor does not get the benefit of the torque multiplication of the transmission, and more importantly the ability to easily employ multiple ratios. This requires that the system either incorporate large gear reductions, thus limiting the vehicle speeds at which the hybrid system can be operated, or that the system be designed to use larger pump/motors which are larger, heavier and more expensive than smaller pump/motors.

Secondly, installing the system after the transmission requires that the driveline needs to be modified in the case of retrofits and makes integration more difficult in new designs.

Additionally, the larger pump/motors required in the driveline systems are heavier, require more space which can be in very short supply, and tend to cost more due to increased materials cost and reduced economies of scale associated with lower production numbers. There is a compounding affect as the pump/motors get larger, because the bigger pump/motors will require more fluid which results in larger reservoirs with more oil in them. Furthermore, the heavier pumps and gearboxes and larger reservoirs will require heavier mounts and reduce the vehicle payload and fuel savings.

Finally, one of the largest shortcomings of existing parallel hydraulic hybrids is that they are designed to be integrated primarily into vehicles that utilize automatic transmissions. Vehicles with automatic transmissions have poorer fuel economy than manual transmissions do in almost all cases. This decreased efficiency comes primarily from the use of a torque converter that is known to be very inefficient, especially during launch. A "torque converter" is a hydrodynamic torque converter that is commonly used to couple automotive and heavy truck engines to automatic transmissions. Many newer transmissions now utilize a torque converter clutch (TCC) to lock up the converter, thereby eliminating most of those losses in some of the operating regions, but the TCC cannot be applied during vehicle launch (a time during which there is a large amount of power loss). While a TCC can increase efficiency and reduce the fuel consumption, the overall efficiency is still usually lower than that of manual transmissions.

SUMMARY

A planetary gearset is used to couple a prime mover, a hydraulic machine (pump/motor) and the input to a transmission in such a manner as to provide one or more of the following seven modes of operation: vehicle launch, extra low reduction ratio, direct drive (into the transmission), hydraulic retardation, hydraulic assist, neutral and neutral with hydraulic supply, and engine off operation. This architecture allows for a smooth vehicle launch without the use of a torque converter or starting clutch, providing greater efficiency both during launch and normal operation. Furthermore, energy normally wasted during vehicle launch can be stored and used later to assist vehicle acceleration. Once the vehicle has been launched the system can be configured to operate as a conventional parallel hydraulic hybrid system.

Installing a hybrid system upstream of the transmission permits the pump/motor to cover a larger range of speeds as the transmission is shifted. A design that allows an automatic transmission to start without using a torque converter could have significant fuel savings potential. A hydraulic hybrid design that provides full parallel hybrid functionality in addition to replicating the functionality of the torque converter (e.g. the ability to idle a vehicle that is in gear and to smoothly launch a vehicle from stop and have torque multiplication without the power and energy losses of the torque converter) has clear advantages over existing systems.

Some embodiments of the present invention include one or more of the following features, functions, and/or characteristics:

- Selectively coupling a pump/motor to the output of a prime mover and to the input of a transmission using a planetary, or epicyclic, gearset with the engine coupled to one of the planetary members (sun, ring or carrier), the hydraulic pump/motor coupled to a second member of the gearset and the input to a transmission coupled to a third member of the geartrain.
- Using the planetary gearset, or gearset with equivalent functionality, to couple the prime mover, the transmission input and the pump/motor, without the need for a torque converter, manual clutch or other starting device.
- Incorporating a clutch to selectively lock any two members of the planetary gearset together to couple the torque of the engine, transmission and the pump/motor together to have the functionality of a conventional hydraulic hybrid.
- Launching the vehicle by slowing the velocity of the hydraulic member down from what is normally a forward direction to some slower, but non-zero speed at which the mixing planetary is then locked up to create a more conventional parallel hydraulic hybrid arrangement.
- Launching the vehicle by accelerating the velocity of the hydraulic member from a negative (from normal operation) speed to a zero speed. In some cases this member acts as a reaction member.
- Running the automatic transmission without a torque converter.
- Shifting the automatic transmission without a torque converter.
- Using a damper plate assembly to reduce driveline vibrations.
- Using a dual mass damper to reduce driveline vibrations with the hybrid.
- Adding in hydraulic power at low engine speeds and high torque requirements in order to reduce the driveline pulsations.
- Reducing the clutch capacity on one or more clutches during a shift to reduce the shock on the driveline.
- Reducing the clutch capacity on one or more clutches during a shift and controlling the reaction torque with the pump motor to reduce the shock on the driveline.
- Controlling the pressure and flow to the hydraulic pump/motor to "fill in the holes" in the torque and smooth the engine pulsations out.
- The hardware arrangement having a Simpson configuration in which the reaction member is a pump.
- Using the Simpson arrangement with just two forward gears such as second and third.
- Using the Simpson arrangement using three forward gears.
- Using the Simpson arrangement with more than three gears.
- Using any planetary gearset or differential for adding hydraulic power to a hydraulic hybrid.
- Using a brake, or clutch, to ground the pump/motor, in addition to having the pump provide reaction torque by hydraulically locking it once the pump has stopped.
- Using the engine to pump fluid into the accumulator when the vehicle is stopped to charge accumulator for future use.
- Using the hydraulics from the hybrid to create the hydraulic power required for the automatic transmission, which is less without a torque converter.
- Using the charge pump to create the hydraulic power needed for the transmissions.
- Locking the transmission up by applying more than one gear or other means and using the engine to drive the pump/motor to emulate a power take off (PTO) driven hydraulic operation.
- Using the same hybrid pump/motor to create the hydraulic power used for other implements or elements.
- Incorporating a hydraulic pump conventionally used on a PTO or the like into a hybrid to increase regenerative braking or acceleration.
- Use of a clutch to decouple the pump/motor in this configuration.
- Electronic control of the pressure regulator to vary pressure—for launch, or hydraulic retarding.
- Electronic controls of the hybrid system.

According to some embodiments of the present invention, a hydraulic hybrid system combines a "through-shaft" pump/motor, and a gearbox, into one common unit, such that torque multiplication is achieved in a much smaller and lighter package. According to some embodiments of the present invention:

Adding one clutch to the system of the above paragraph permits effectively disengaging the pump/motor:
- Clutch can disengage a reaction on an epicyclic gear train.
- Clutch can disengage the pump/motor from the gear train.
- Clutch can disengage the gear train from the through-shaft.
- Clutch can be a multi-plate wet clutch, a dry friction clutch, dog clutch (with or without a synchronizer), band brake, or the like.
- The clutch can be controlled manually, via electronically controlled, or passively such as from a pressure source or something like centrifugal force.

According to some embodiments of the present invention, the gear train includes multiple gear ratios.
- Adding a second clutch on the epicyclic systems permits the planetary to be locked up, or the pump/motor may be directly coupled to the through-shaft.
- Adding multiple gear ratios that can be clutched in and out, somewhat similar to that done in a typical manual automotive gearbox. Many other options exist.

According to some embodiments of the present invention, a one way clutch may be added in parallel to the reaction clutch in an epicyclic gearbox, or on one of the ratio gear clutches so that the up-shift and down-shift from the lower and higher gear ratios can be done without having to synchronize two clutch events (e.g. making the transmission what is often referred to as "fully deluxe").

According to some embodiments of the present invention, a second pump may be integrated for various purposes including, but not limited to, supercharging the main pump, a creating pressure for the displacement controller and/or clutch apply pressure.
- The charge pump can be configured to spin with the through-shaft.
- The charge pump can be configured to spin with the main pump/motor.
- The charge pump can be configured to spin with some part of the gear train.
- The charge pump can be configured to operate with an external power source such as an electric motor.

According to embodiments of the present invention, a valve body may be integrated to the hydraulic hybrid system like an automatic transmission to make a more compact package.

Using cartridge valves in the valve body.

Using more integrated spool and poppet valves.

Any combination of the above.

According to some embodiments of the present invention, a sump may be integrated to the integrated hydraulic hybrid unit.

According to embodiments of the present invention, the hydraulic hybrid system is configured to replace or augment some or all of the other engine or powertrain-driven hydraulics so that that system is not needed, resulting in increased efficiency as it uses recovered energy and the operator does not need to elevate the engine speed.

According to embodiments of the present invention, the hydraulic hybrid system is configured such that the output shafts have many different mounting options to transmit torque. The input and output shafts can have splines that will accept the yokes for a universal joint on a driveshaft, for example.

According to embodiments of the present invention, the hydraulic hybrid system is configured to mate right up to the back of an automotive transmission output or transfer case output.

Some embodiments of the present invention include one or more of the following features, functions, and/or characteristics:

Inserting a torque split hydraulic transmission at the engine output and before the normal transmission input with the power from the engine and the hydrostat being coupled through a planetary gearset with the output going to the normal transmission to extend range and provide reverse.

Starting the vehicle by slowing down a hydraulic member that is rotating in a direction counter to its normal operation and restricting the output of the device to build torque and therefore slow the device down.

Restricting the output of a device using a relief valve, any other type of restriction, valve or by plumbing directly to a device at high pressure such as an accumulator.

Capturing the fluid that has passed over the restriction device and storing the high pressure energy.

Using the just stored energy from launch to augment the acceleration.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
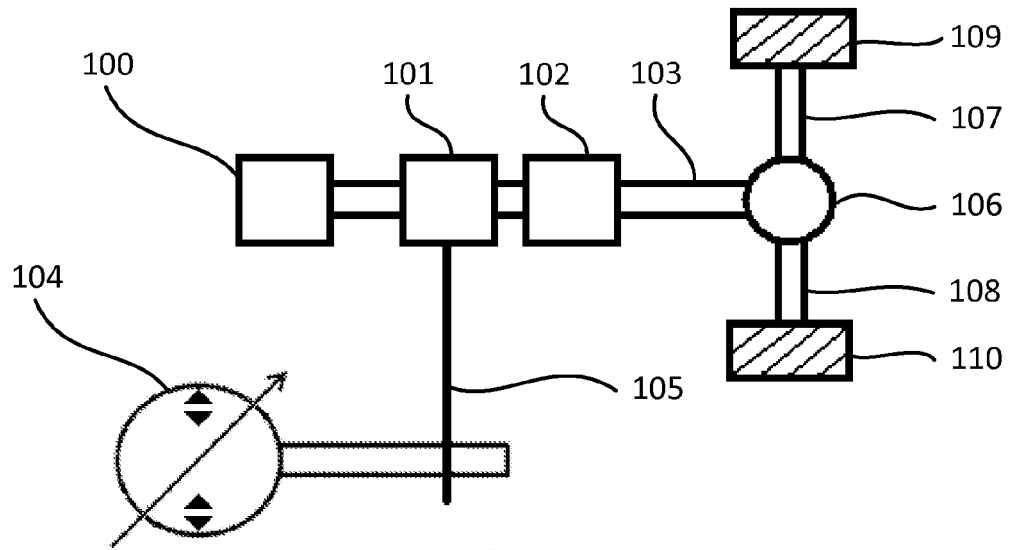
FIG. 1 illustrates a schematic of a powertrain comprised of a planetary gear set and hydraulic pump/motor, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the appended claims.

DETAILED DESCRIPTION

FIG. 1 schematically illustrates a hydraulic hybrid system that provides hydraulic hybrid functionality to motor vehicles, especially large vehicles that tend to stop and start repeatedly such as refuse trucks, yard hostlers and city buses, according to embodiments of the present invention. The system is comprised of a planetary, or epicyclic, gearset 101 which is comprised of a sun gear, a carrier and a ring gear. One element of the gearset 101 is coupled to the output of the prime mover 100 (the prime mover 100 is an internal combustion engine in this case) and a second element of the gearset 101 is coupled to the input of a transmission 102, which is preferably an automatic variety that is designed to shift under load, but can be of any type including, but not limited to, a manual transmission. In this embodiment a driveshaft 103 couples the output of the transmission 102 to a differential 106 that is coupled to axle shafts 107 and 108, which are in turn coupled to the wheels 109 and 110. A third element of the planetary gearset 101 is also coupled to a hydraulic machine, also referred to as pump/motor 104 by a coupling 105 that may, or may not have an effective gear ratio of unity. In this case a chain and sprocket assembly of the type used in automotive and light truck transfer cases is used. Many other mechanisms can be employed to provide the functionality of coupling 105 and include, but are not limited to, belts and pulleys, shafts, chains and sprocket, gears and/or the like.

As used herein, the term "coupled" is used in its broadest sense to refer to elements which are connected, attached, and/or engaged, either directly or integrally or indirectly via other elements, and either permanently, temporarily, or removably. As used herein, the term "rotatably coupled" is used in its broadest sense to refer to elements which are coupled in a way that permits one element to rotate with respect to another element. As used herein, the terms "fluidly coupled" or in "fluid communication" are used in their broadest sense to refer to elements which are coupled in a way that permits fluid flow between them. As used herein, the term "mechanically coupled" is used in its broadest sense to refer to elements which are coupled in a way that permits the torque or force of one element to be transmitted to another element.

Figure 2:
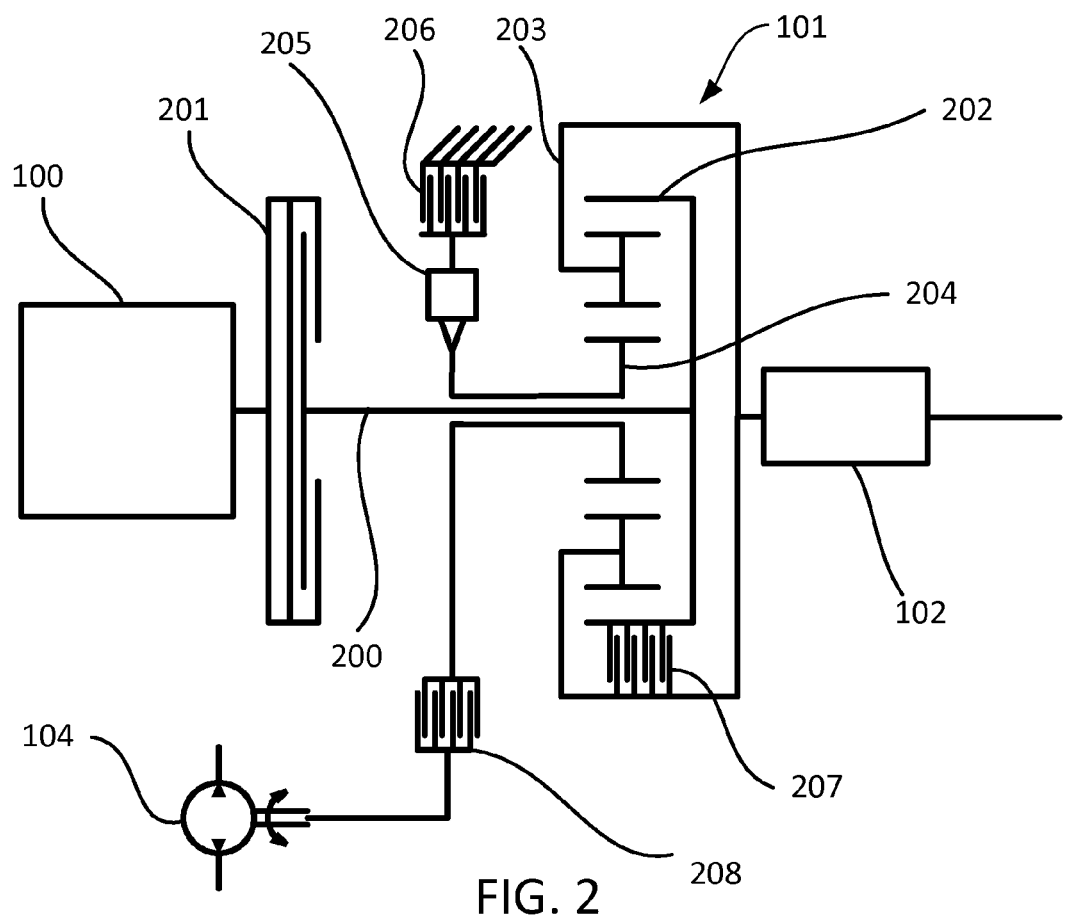
FIG. 2 illustrates a diagram of the planetary gear set and the hydraulic hybrid system of FIG. 1, according to embodiments of the present invention.

FIG. 2 illustrates a schematic diagram of the system described in FIG. 1 in greater detail, according to embodiments of the present invention. The system is comprised of an engine 100, which is mechanically coupled to an input shaft 200 through torsional damper 201, which may be comprised of springs and friction elements. The damper 201 may be used to attenuate driveline vibrations which can be caused by many factors, including the firing pulses of the engine and shifting of the transmission. In other embodiments the damper may be comprised of one or more of the following non-limiting examples: helical springs and friction elements, viscous coupling elements, dual mass flywheels, friction elements designed to have some slippage, active elements that control the amount of friction between the input and the output, special lubricants, and friction modifiers. The damper may also be in a predominantly dry environment or may be immersed or in regular contact with a lubricating or working fluid such as automatic transmission fluid, hydraulic fluid, engine operating oil, or the like. The system may also be configured so as to not incorporate a damper assembly but instead couple the engine 100 directly to the input shaft 200 or to the input shaft through a clutch (not shown), but both of these alternative configurations may lead to undesirable vibrations in certain operating modes.

According to the hydraulic hybrid system illustrated in FIG. 2, the input shaft 200 is coupled to the ring gear 202 of the planetary gear set 101, the carrier 203 of the planetary gearset 101 is coupled to the input of the transmission 102, and the sun gear 204 of the planetary gear set 101 is coupled to a hydraulic machine 104. Also shown in FIG. 2 is a one-way roller clutch 205 that couples the sun gear 204 to a second hydraulically actuated multi-plate wet clutch 206, such that the two parts may rotate only in one direction relative to each other. One side of the clutch 206 is coupled to a ground such as, for example, the transmission case, and the other side of the clutch 206 is coupled to the one-way clutch 205 such that when clutch 206 is engaged, the one way clutch 205 will allow the sun gear 204 to rotate in one direction, which may be referred to as the forward direction, but not in the other (reverse) direction.

Also shown in FIG. 2 is a hydraulically actuated multi-plate wet clutch 207 that is used to selectively couple the carrier 203 to the ring gear 202, according to embodiments of the present invention. Once clutch 207 has been applied and the ring gear 202 and the carrier 203 are rotating at the same speed, the sun gear 204 will rotate at the same speed as the other two elements of the planetary gearset, according to kinematic principles. Coupling any two elements of the planetary 101 gear set (carrier, sun gear, or ring gear) together will achieve similar results, and one skilled in the art will recognize, based on the present disclosure, that there are many configurations and locations for a clutch that would accomplish the same desired output.

The one-way clutch 205 may be of many designs including, but not limited to a roller clutch, a sprag clutch, a ratchet, and/or any other one-way clutch known to one of ordinary skill in the art, based on the present disclosure. According to embodiments of the present invention, clutches 206 and 207 may be of various designs including, but not limited to, multi-plate wet clutches, dry clutches, band clutches, cone clutches, synchronizers, dog clutches, electromagnetic clutches, and the like, and may be controlled electronically, hydraulically, pneumatically, mechanically, manually, passively or by any other means. Clutch 207 may be eliminated or omitted, according to embodiments of the present invention. Similarly, clutch 205 and/or clutch 206 may be eliminated and/or omitted, according to embodiments of the present invention.

According to the embodiment of the present invention shown in FIG. 2, a hydraulically actuated multi-plate wet clutch 208 can be used to selectively couple the hydraulic machine 104 to the sun gear 204 via chain 105. Similarly to clutches 206 and 207, clutch 208 can take many different forms and actuation means including, but not limited to, those previously described for clutches 206 and 207.

The embodiment illustrated in FIG. 2 can be configured or adapted to operate in one of multiple modes by using one more of the following mechanisms: engaging or disengaging clutches, controlling the engine torque, opening or shutting valves in the hydraulic system, adjusting regulator pressures in the hydraulic system, adjusting the displacement of the hydraulic machine, selecting specific gears in the transmission, shutting the engine off, and controlling valves in the auxiliary hydraulic circuit.

The laws of kinematics and dynamics of planetary gearsets dictate that the maximum steady state torque that can be transmitted between the engine 100 (coupled to the ring gear 202) and the input to the transmission 102 (coupled to the carrier 203) will be limited to some ratio of the torque reaction that the hydraulic machine 104 exerts on the sun gear 204 of the planetary gearset 101 through chain 105. According to embodiments of the present invention, this reaction torque created by the pump/motor 104 can be used to control various modes of the vehicle operation including, but not limited to, vehicle idle and launch.

According to the embodiment of the present invention illustrated in FIG. 2, a vehicle idle mode can be achieved with the transmission 102 engaged in a forward or reverse gear by controlling the magnitude of the pump/motor 104 torque to zero or a substantially low level. This can be accomplished by one or more of the following mechanisms: setting the pump/motor 104 displacement to zero or low value, connecting the output of the pump/motor to low pressure, disengaging clutch 208 or starving the pump/motor of fluid. By not providing a torque reaction to the sun gear, little torque can be transmitted between the engine and the transmission. In this configuration with little, or no, reaction torque at the pump/motor 104, the engine 101 can be commanded to operate at a wide variety of speeds, including idle, and the resulting pump/motor 104 speed will be a function of both the engine 101 speed and the transmission 102 input speed. If the transmission is in gear with clutch 208 engaged, the transmission input speed will be a ratio of the vehicle speed; this will be zero if the drive wheels are not rotating, and therefore the pump 104 speed will be a ratio of the engine 101 speed. In the embodiment of FIG. 2 the pump/motor 104 will be rotating in a direction opposite to that of the engine 101, and will be faster in magnitude.

In this configuration the vehicle can be controlled to idle similar to other vehicles with conventional powertrains. This and other embodiments of the present invention are applicable to a wide variety of powertrain configurations including, but not limited to, a manual transmission and clutch assembly, an automatic transmission and a torque converter, a hydrostatic drive, a direct drive system, a fixed ratio driveline, and a continuously variable transmission (CVT).

According to embodiments of the present invention, the amount of torque transmitted to transmission 102 can be controlled by varying the amount of torque reaction of the pump/motor 104 and/or the engine 101 torque. These levels can be set to levels that transfer a small amount of torque to the transmission 102 and emulate what is known as "driveline creep," a situation in which a vehicle with an automatic transmission has a tendency to slowly accelerate on a level grade if in gear without a brake or other retarding mechanism in place.

Various launch modes can be accomplished in multiple ways, including, without limitation, various combinations of increasing the reaction torque of the hydraulic machine, engaging the clutch 208, increasing the engine torque, engaging or disengaging clutches 206, and/or engaging or disengaging clutch 207.

According to the embodiments of the present invention, vehicle launch can be initiated in a vehicle that is already in gear, and has clutch 208 applied, by increasing the torque reaction of the pump/motor 104 while controlling the torque on the engine 101; this will increase the torque transmitted between the engine 101 and transmission 102 input. The torque reaction of the pump/motor can be controlled by one or more of the following mechanisms: adjusting the displacement, controlling the pressure at the pump outlet, controlling the shaft speed, and controlling the flow area into and out of the pump.

As the reaction torque increases to large enough values, the pump/motor 104 will start to decelerate as the input shaft 200 to the transmission 102 increases in speed and the vehicle starts to accelerate. The rate of acceleration can be controlled by multiple mechanisms, including, but not limited to, controlling the engine torque and controlling the pump torque. The configuration of the gear set 101 results in a torque multiplication between the engine and the transmission input, which assists the launch, according to embodiments of the present invention. According to embodiments of the present invention, the gear set 101 may be configured such that, if the clutch 207 is not engaged, the torque available at the carrier 203 (which is coupled to the input of the transmission 102) will be a multiple of the engine torque, by a ratio determined by the geometry of the planetary gear set. In some embodiments of the present invention, the carrier torque will be approximately 1.6 times that of the engine torque.

As the vehicle accelerates, the speed of the hydraulic machine will become less and less negative until it approaches zero. During this time the engine can be controlled in a variety of ways including, but not limited to, speed control, torque control, constant power, and minimum energy. Furthermore, the engine can be controlled using a variety of control algorithms that can optimize or affect the fuel consumption, vehicle acceleration, driver comfort, or any other objective function.

According to some embodiments of the present invention, a second launch, or "low" mode can be accomplished by applying clutch 206, which provides a reaction for the one way clutch 205 and prevents the pump/motor 104 from rotating backwards. If the clutch 206 is applied before the pump/motor 104 reaches zero speed, the combination of the one-way clutch 205 and clutch 206 will cause the pump/motor speed to go to zero. If clutch 206 is applied after the pump/motor 104 has reached zero speed, it will prevent the pump/motor 104 from rotating backwards until the clutch 206 is disengaged. With the sun gear 204 at zero speed and capable of imparting a torque reaction, the gearset 101 continues to multiply the torque of the engine 100. The torque multiplication is beneficial, particularly in systems which do not use a torque converter. Once in this mode, the engine speed will increase as the vehicle speed increases and at some point will get high enough to warrant selection of a new gear.

According to embodiments of the present invention, a direct drive mode can be accomplished by applying clutch 207, which will cause all of the elements of the planetary gear set 101 to rotate in unison and thereby reduce the engine speed due to the relative inertias of the engine and the vehicle. Once in this mode, the torque multiplication from the engine to transmission will be 1.0. Thus, by selectively engaging clutches 206 and 207, the planetary 101 can either multiply engine torque or become a direct drive connection. Once clutch 207 is engaged, the vehicle can operate much as conventional vehicle, with the exception that it will have no torque converter.

Figures 3, 4:
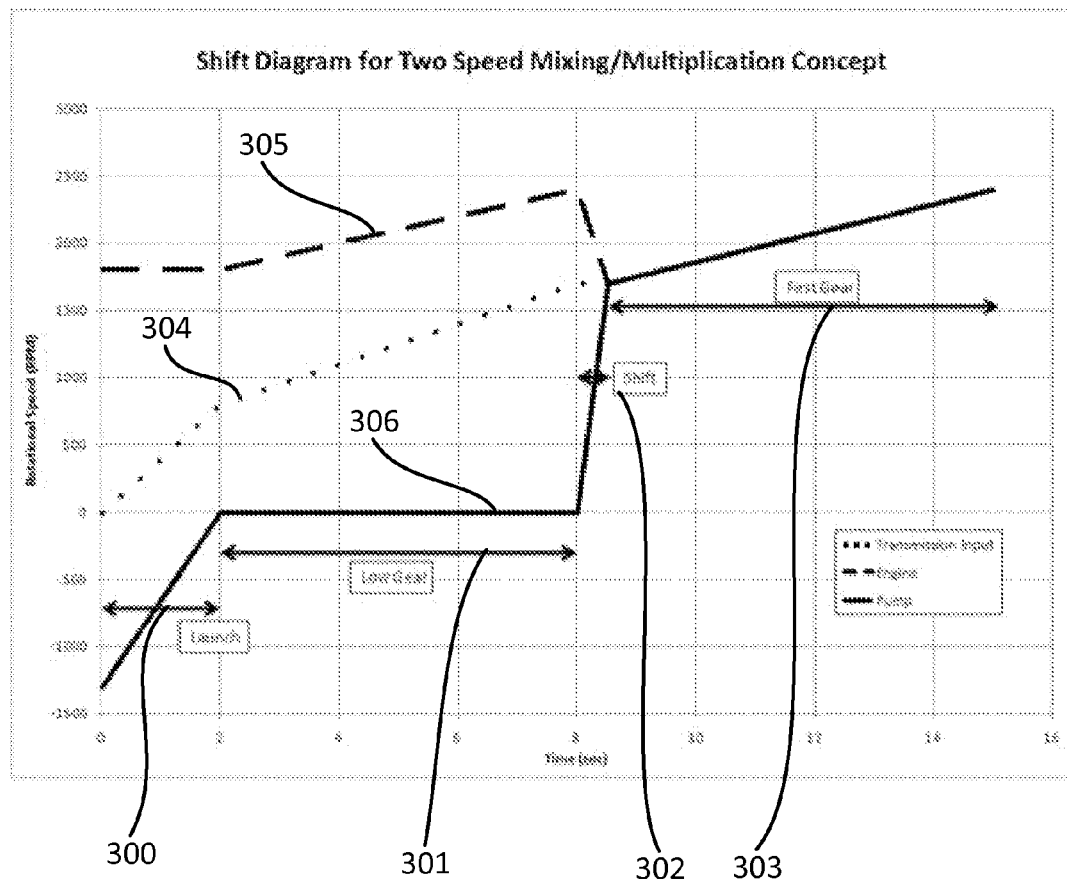
FIG. 3 illustrates a clutch state diagram for the system of FIGS. 1 and 2, according to embodiments of the present invention.
FIG. 4 depicts a graph illustrating the launch of the hydraulic hybrid system of FIGS. 1-3, according to embodiments of the present invention.

FIG. 3 represents a clutch state diagram that details which clutch (of FIG. 2) is applied for each mode. According to embodiments of the present invention, there are three modes for this planetary system. The first mode is the "launch" mode in which the vehicle is accelerated from rest. The second mode is a "low" gear ratio that multiplies the engine torque and can make up for the torque multiplication that would normally be achieved with the torque converter in systems having torque converters. The last mode is a "direct drive" mode.

FIG. 4 depicts a graph of the speeds of the different elements of the gearset 101 as a function of time, according to some embodiments of the present invention. In this example, the launch mode, indicated as 300 in FIG. 4, occurs between time 0 and 2 seconds. During that time, the speed of the hydraulic unit or pump/motor 104 changes from a negative value to zero. Once the sun gear 204, connected to the pump/motor in this embodiment, has stopped rotating and is kept from rotating either by clutches 205 and 206, or by restricting the output of the pump/motor 104 and hydraulically locking it, the planetary gearset 101 will be operating in a "low" mode, indicated as 301 in FIG. 4, with a combined gear ratio that will be equal to the low ($1^{st}$ gear) ratio of the transmission 102 multiplied by the multiplication created by the planetary gearset. This "low" mode is shown as occurring from 2 to 8 seconds in FIG. 4.

Once the planetary gearset 101 is in the "low" mode, indicated as 301 in FIG. 4, the vehicle can continue to accelerate with both the engine speed and the transmission input speed increasing. When desired, clutch 207 can be engaged and the speeds of all of the elements of the planetary gearset (sun gear, carrier, and ring gear) will approach the same speed and rotate together resulting in a direct drive coupling of the engine and transmission input, providing a "direct drive" mode, indicated by 303 in FIG. 4 and occurring after 8 seconds in the graph. At this time, the combined ratio will be equal to the first gear ratio of the transmission 102. In the "direct" mode, the vehicle can be accelerated using the engine alone or can benefit from the hydraulic hybrid adding power stored in the accumulator. Similarly, the hydraulic hybrid can be configured to absorb power from the driveline, feasibly increasing overall fuel economy by allowing the engine to operate at higher load than the conditions might require. This can be an effective method to increase the efficiency of the powertrain as the higher load point may be a more efficient operating point. Once in the "direct" mode, the hydraulic hybrid has the ability to absorb power, add power, or be in a neutral mode.

Figure 5:
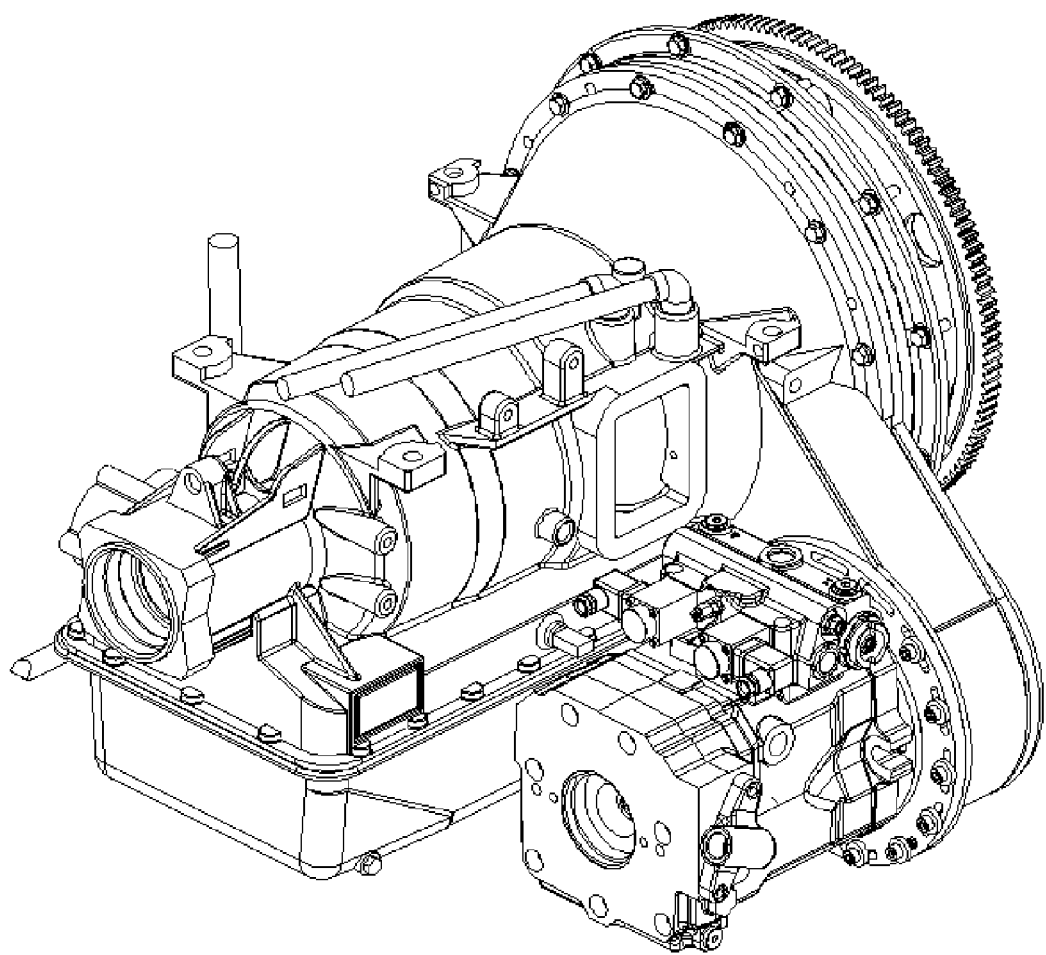
FIG. 5 illustrates an isometric view of a hybrid system according to embodiments of the present invention.

According to some embodiments of the present invention, the planetary gearset 101 and related hardware such as, but not limited to, the coupling mechanism 105, bearings, shafts and the like, may be in one or more separate housing that mates with a transmission and engine either of which may, or may not, be modified. This modular approach provides benefit for embodiments of the present invention intended for retrofitting existing powertrains but is equally applicable for new powertrains as well. FIG. 5. illustrates an example of an axial piston pump with displacement of approximately 135 cc/rev coupled to an automatic transmission without a torque converter, according to embodiments of the present invention. Similarly, other embodiments of the present invention incorporate the gearset 101, and other required hardware into the transmission itself and use one or more separate housings that contain the coupling to the hydraulic machine 104 and is external to the transmission. Other embodiments of the present invention incorporate all, or most of, the parts required to provide system functionality (transmission functionality, pump functionality, coupling functionality, and other systems to make the system function) into substantially one housing or package.

According to some embodiments of the present invention, the planetary gearset 101 and the transmission 102 are integrated to such an extent that they may be considered part of the same gearbox or gear assembly. Furthermore, in some cases, the functionality of the planetary gearset 101 can be achieved within some transmission designs, eliminating the need to add an additional gearset. Some embodiments of the present invention use a hydraulic machine (also referred to as a pump/motor) that is substantially coaxial and/or collinear with one or more shafts in the transmission and/or engine, and other embodiments use pumps that are oriented with shafts parallel to the centerline of one or more transmission and/or engine shafts. Still other embodiments include the pump assembly mounted in a manner that is not coaxial, collinear, or parallel to any shafts in the prime mover or engine and/or transmission or driveline. Based on the disclosure provided herein, one of ordinary skill in the art will understand that there are numerous combinations and arrangements for assembling the individual components into one or more sub assemblies and housings that provide substantially the same function, and the examples given are intended to be exemplary and non-limiting.

Operation of the hydraulic hybrid can benefit greatly from integrating the controls of the hybrid and the automatic transmission and/or other controllers. There are multiple mechanisms and methods for controlling the system including, but not limited to, a separate controller that runs autonomously, a separate controller that communicates with other controllers such as a transmission controller and/or an engine controller and/or a vehicle controller, combining with another controller, and the like, and the communications protocols between the controller and the controlled devices (e.g. valves, clutches) could be sent over various media including, but not limited to, wireless, dedicated lines, serial data and the like.

Figure 6:
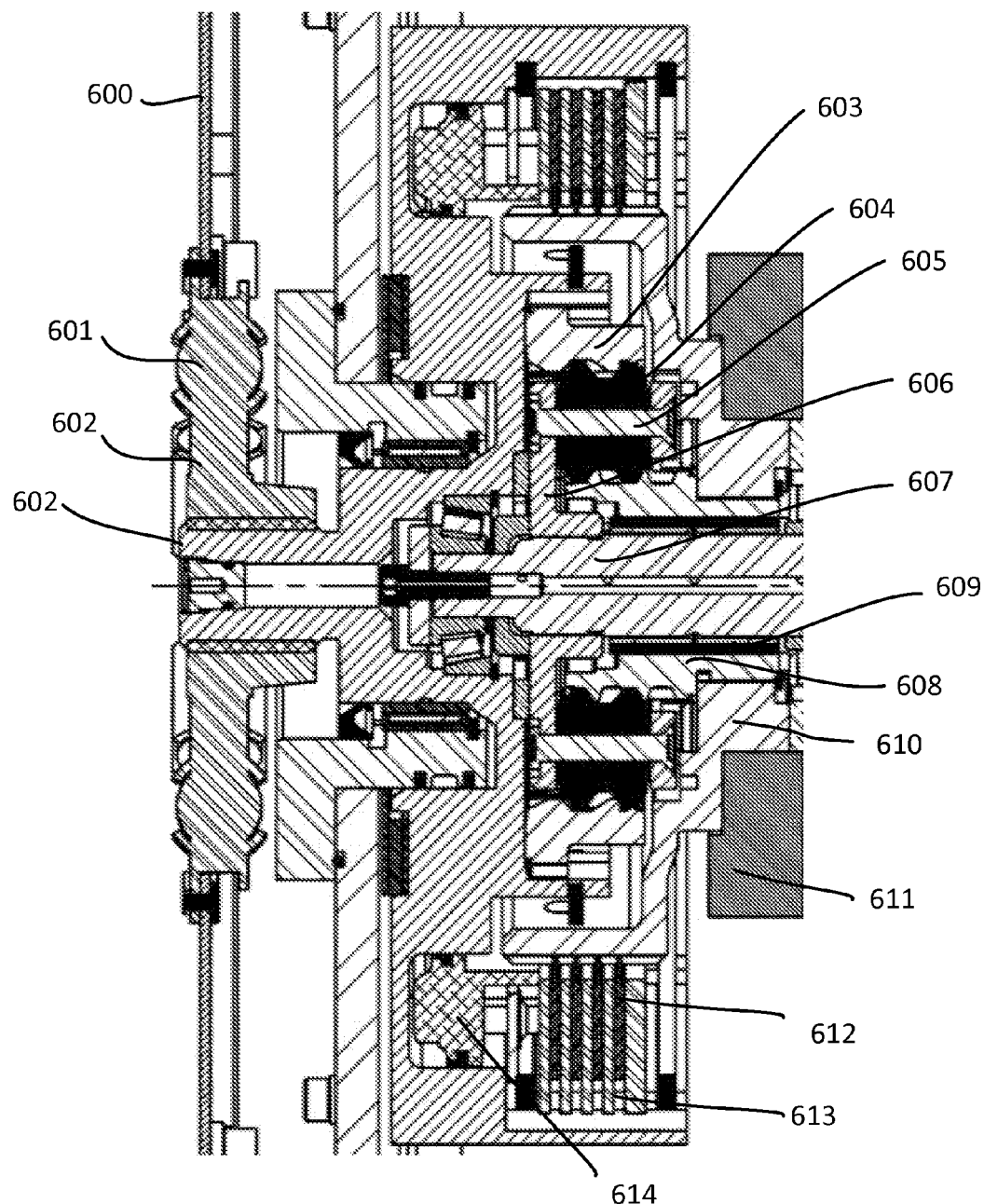
FIG. 6 Illustrates a cross sectional view of a mechanical assembly, according to embodiments of the present invention.

FIG. 6 illustrates a cross-sectional view of a hydraulic hybrid system, according to embodiments of the present invention. In this embodiment, a clutch disc 600 is coupled to the output of an engine, such as for example an International DT466E, and the disc is coupled to a spring damper assembly 601 which is in turn coupled to the input splines on the clutch housing shaft 602. A ring gear 603 is splined to the clutch housing 602 so as to transfer torque between the two. The ring gear 603 mates with a plurality of planet gears 604 which are free rotate on the carrier pins 605. The carrier pins are coupled to the carrier 606, which is in turn coupled to the input shaft of the transmission 607, such as, for example, an Allison AT 545. A sun gear 608 rides upon a bearing 609 which rides upon input shaft 607, such that the two are free to rotate relative to each other. A clutch basket 610 is coupled to the sun gear and also acts to transmit torque to the sprocket 611, which itself is transfers torque from the pump/motor. Internal splined clutch plates 612 are splined to the clutch basket 610 and are in contact with the external clutch plates 613, which are splined to the clutch housing 602. A clutch piston 614 is used to create clutch apply force that is used to apply the clutch and couple the clutch housing 602 and therefore ring gear 603 to the sun gear 608, which will cause all of elements of the planetary gearset (sun gear, carrier and ring gear) to rotate at the same angular speed.

Figure 7:
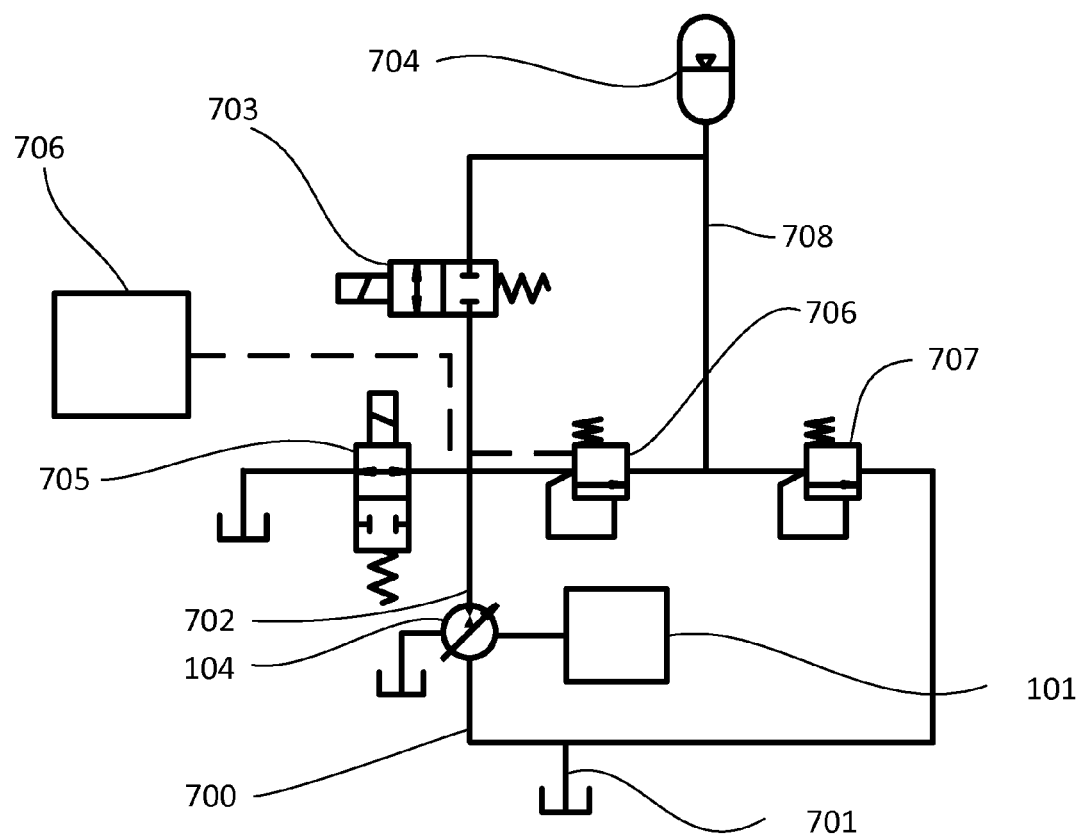
FIG. 7 illustrates a hydraulic schematic of a hydraulic hybrid system, according to embodiments of the present invention.

FIG. 7 illustrates a hydraulic schematic for an embodiment of the present invention. In this embodiment a pump/motor 104 is coupled to a planetary gearset 101, which is also coupled to the engine and transmission input in an arrangement similar to that illustrated in FIG. 2. According to various embodiments of the present invention, various types of pump/motors can be used for the system including, but not limited to, axial piston pumps, radial piston pumps, ball pumps, vane pumps, internal gear pumps, external gear pumps, geroter pumps, swashplate pumps, and bent axis pumps. Furthermore, the pump/motors may be of any size or displacement, may be fixed or variable displacement, may be unidirectional or bidirectional, may operate as both pumps and motors, may be designed for open loop applications, may be designed for closed loop applications, may be designed for ½ closed loop allocations, may be designed for hydrostats, may be capable of doing what is known in the art as "going over center," may be incapable of "going over center," may be operated digitally, may have the ability to control the flow in and/or out of one or more cylinders independently or in unison, and may have intelligent controls. Similarly, alternate embodiments of the present invention utilize a plurality of pumps, and/or accumulators and/or reservoirs. The pump may be an axial piston pump with displacement of 135 cc/rev, according to embodiments of the present invention.

The low pressure side 700 of the pump/motor 104 is connected to a reservoir 701, with sufficient capacity to supply operating fluid for the pump/motor and other circuits. Alternate embodiments include a mechanism to ensure fluid is supplied to the pump/motor 104 at pressures above atmospheric; such a mechanism may include, but is not limited to, low pressure accumulators, pressurized reservoirs, intensifiers, charge pumps, and the like. The reservoir may be vented to atmospheric pressure and may be approximately 30 gallons in capacity, according to embodiments of the present invention.

The high pressure side 702 of the pump/motor is in fluid communication with a valve 703, which in turn is in fluid communication with one or more hydraulic storage devices, such as a bladder accumulator 704, such that the valve 703 can selectively allow fluid to flow between the accumulator 704 and the pump 104 in the presence of a pressure differential. The valve 703 may be an electronically controlled two-position, two way solenoid valve made by Sun Hydraulics, but valves of a wide variety can be used including, but not limited to, poppet valves, spool valves, single stage valves, multi-stage valves, proportional valves, servovalves, digital valves, and the like, and the valves can be controlled electronically, pneumatically, hydraulically, mechanically, actively, passively, and the like, according to embodiments of the present invention. Similarly, other embodiments of the present invention use accumulators of various types including, but not limited to, piston accumulators, bladder accumulators, gas filled accumulators, weight biased accumulators, spring biased accumulators, steel accumulators, composite accumulators, and foam filled accumulators. One reasonably skilled in the art would recognize, based on the present disclosure, that a wide variety of valves, accumulators, pumps, hoses, reservoirs and other hydraulic components could be used with substantially the same functionality, and the examples given are for illustration purposes and are intended to be non-limiting.

The outlet of the pump/motor 104 is in fluid communication with a valve 706; valve 706 is, in turn, in fluid communication with line 708, which is, in turn, in fluid communication with the accumulator 704, a second regulating valve 707 and valve 703. Valve 706 may be an electronically controlled pressure regulating valve that can be used to limit the maximum pressure at the pump outlet 702 to a value that can be varied using an electronic controller, according to embodiments of the present invention. A relief valve is in fluid communication with line 708 and the reservoir and is used to limit the maximum pressure in line 708 and therefore the accumulator to maximum level. Any fluid vented by the relief valve 707 will return to the reservoir 701. Valve 707 may be a manually set relief valve which operates to prevent the system from over pressurizing, according to embodiments of the present invention.

The outlet of the pump/motor may also be in fluid communication with a valve 705, which is, in turn, also in fluid communication with the reservoir. Valve 705 may be used to unload the pump by allowing the output flow to return to the reservoir with minimal restriction.

When the hydraulic hybrid system depicted in FIG. 2 is in the "idle" mode, the pump/motor will be rotating backwards. When the transmission is in gear and the vehicle launch is desired, valve 705 is shut, and the displacement of the pump/motor is increased such that it will act as pump and pull fluid from the reservoir and pump it to the pump outlet 702. The pressure at the pump outlet can be controlled in multiple ways. One method involves setting the regulation pressure of valve 706 to a maximum value and opening valve 703 to allow the pump outlet to be connected to the accumulator. In this case, the pressure at the pump outlet will be approximately equal to that of the accumulator. In this mode of operation, the fluid being pumped to create the torque reaction is being stored in the accumulator for use later. The pump/motor 104 torque can be controlled by controlling the displacement and/or the pressure at the pump outlet.

If the accumulator pressure is lower than desired to get maximum pump/motor torque, valves 703 and 705 can be shut and valve 706 can be used to adjust the pressure on the pump outlet. In this case some of the energy used to pump the fluid is still recovered unless the accumulator is at a pressure greater than that at which relief valve 707 is set.

Once the vehicle has started the launch and the planetary is in the "direct" mode, the system can be used to absorb torque from the powertrain by adjusting the displacement of the pump/motor and opening valve 703 to recover the hydraulic energy into the accumulator. If greater retarding torque is desired, valve 703 can be shut and the pressure controlled by valve 706. In this mode, the system operates similarly to most conventional hydraulic hybrids, with the exception being an option to restrict the pump outlet to raise the system pressure and increase braking torque. Similarly, the hydraulic energy stored in the accumulators can be used to assist the vehicle acceleration by opening valve 703 and controlling the pump/motor displacement. A neutral mode can be achieved by combinations of one or more of the following: setting the pump/motor 104 displacement to zero, shutting the valve 703 off, opening valve 705, and/or disengaging the pump/motor from the planetary gearset using clutch 208. In the charging, discharging, and neutral modes, the system functions similarly to a conventional parallel hydraulic hybrid.

Figure 8:
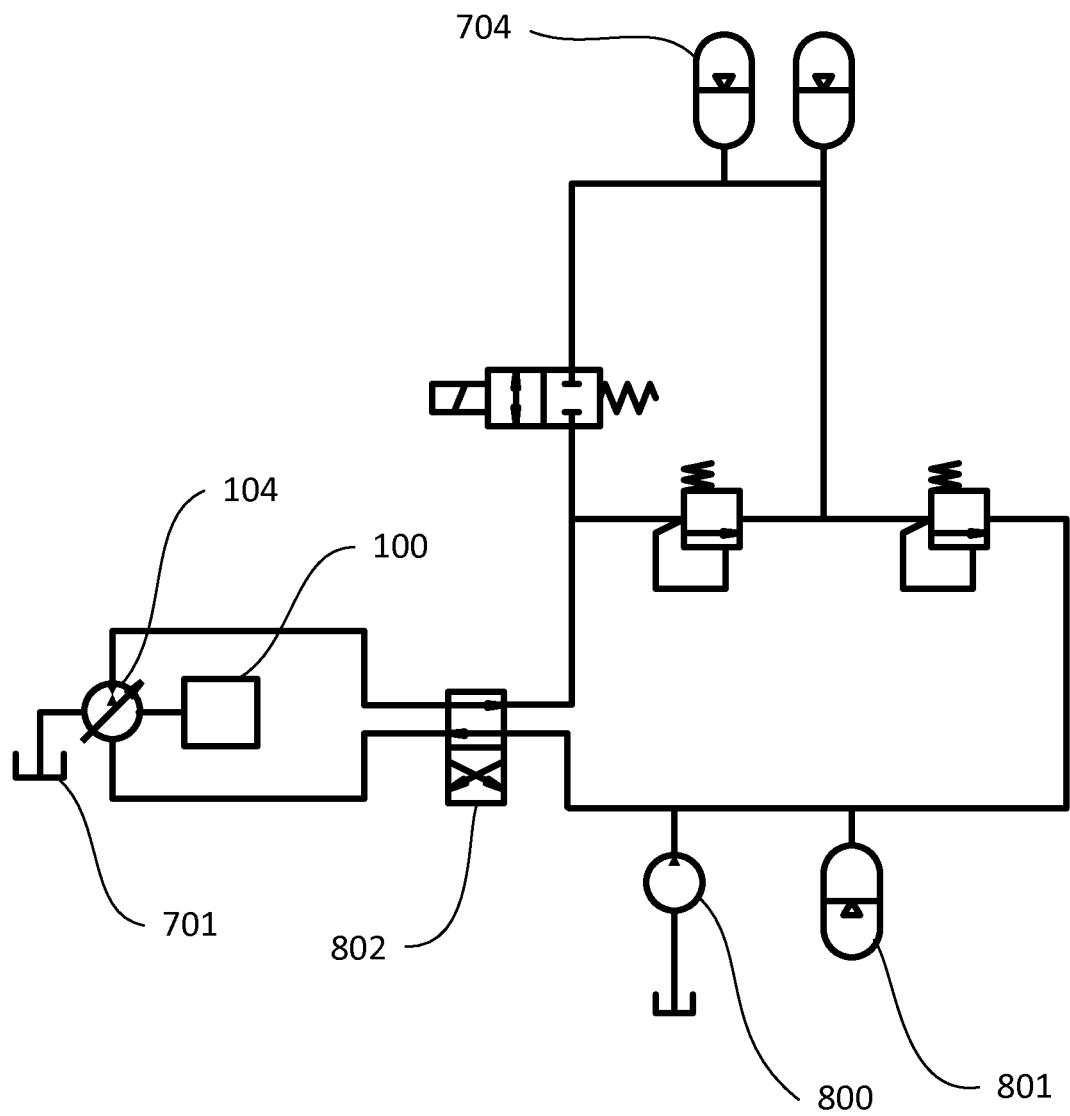
FIG. 8 illustrates a hydraulic schematic of hydraulic hybrid that uses a two-position four-way valve to reverse the inlet and outlet of the pump/motor, according to embodiments of the present invention.

It is not necessary that an over-center pump is used, according to embodiments of the present invention. Instead, valving can be used to reverse the input and output of the pump/motor 140. FIG. 8. illustrates a two-position, four-way valve 802 used to reverse the inlet and outlet plumbing on the pump/motor 104. Similarly, two two-position, three-way valves or four two-position, two-way valves can be used to switch the inlet and the outlet of the pump. FIG. 8 also illustrates that a plurality of accumulators can be used on the either the high pressure and/or the low pressure side according to embodiments of the present invention.

Alternate embodiments of the present invention utilize one or more of the following features: a charge pump to supercharge the pump/motor 101 inlet, a pressurized reservoir on the inlet to the pump/motor, one or more low pressure accumulators on the inlet to the pump/motor, a check valve to allow flow to recirculate from the low pressure side of the pump to the high pressure side, a pump for cooling and/or filtration and/or to control pressure, a control pressure circuit, a filtration circuit, relief valves, drain ports, case cooling, and a cooling circuit.

Figure 9:
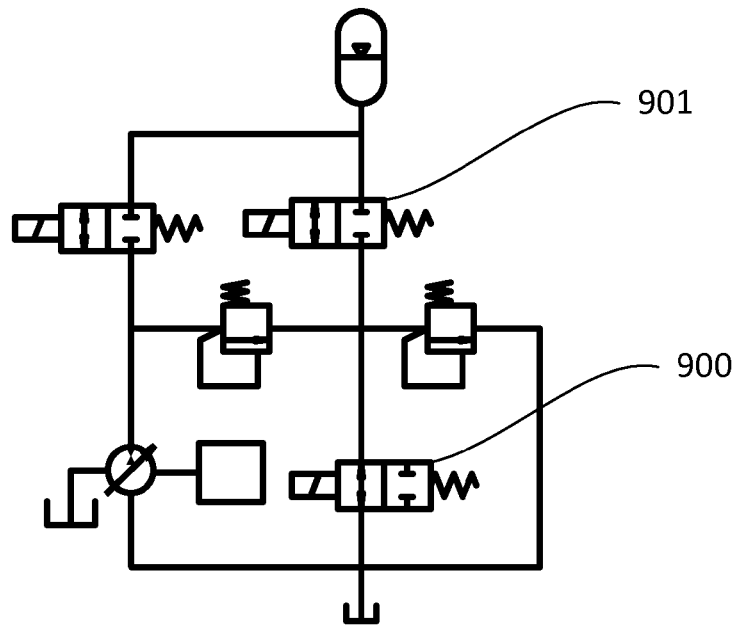
FIG. 9 illustrates a hydraulic schematic of a hydraulic hybrid system, according to embodiments of the present invention.

FIG. 9 illustrates an embodiment in which a pair of two-way valves 900 and 901 are employed by the system. These valves allow the fluid from the pump outlet to circulate back to the tank by opening valve 900 and closing valve 901 if a high amount of pump torque is not desired. If a high pump torque is desired, valve 900 would be closed and valve 901 would be opened so that fluid from the pump outlet would flow to the high pressure accumulator 704. If the two way valves used are normally open two way valves, when the vehicle is turned off and these valves are no longer powered, the high pressure accumulator will automatically empty into the sump or low pressure accumulator, according to embodiments of the present invention.

Figure 10:
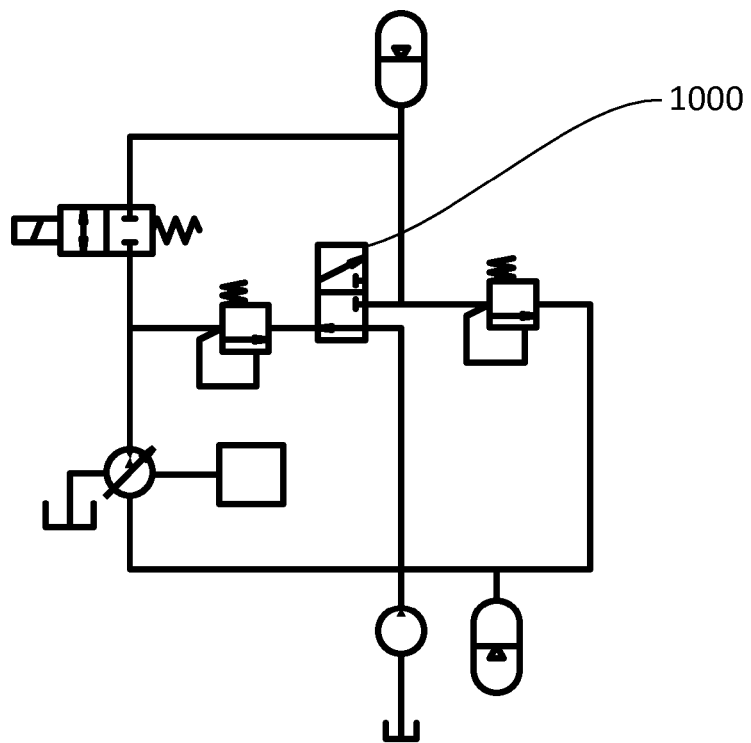
FIG. 10 illustrates a hydraulic schematic of a hydraulic hybrid system, according to embodiments of the present invention.

FIG. 10 illustrates how a two-position, three-way valve 1000 can be used to direct the fluid flow from the pump outlet to the system tank/sump if little torque is desired from the pump 104, or to direct the fluid flow from the pump outlet to the high pressure accumulator in the system if more torque is desired from the pump.

FIGS. 11 through 16 illustrate the speed profiles for the three different elements of the planetary gearset (sun gear, carrier and ring gear) when the vehicle is launching with constant engine speed according to embodiments of the present invention. The six figures correspond to six different configurations of connecting the three elements of the gearset to the pump/motor, the prime mover, and the output. The notation used for these figures consists of three letters, with the first letter corresponding to the element to which the pump/motor is coupled (directly or indirectly), the second letter corresponding to the element to which the prime mover is coupled (directly or indirectly), and the last letter indicating the element to which the transmission input or driveline is coupled (directly or indirectly), with "S" denoting the sun gear, "C" denoting the carrier, and "R" denoting the ring gear, according to embodiments of the present invention. Thus, a SRC system is one similar to that illustrated in FIG. 2, in which the pump/motor 104 is coupled to the sun gear 204, the engine 100 is coupled to the ring gear 202, and the carrier 203 is coupled to the transmission 102 input.

Figure 11:
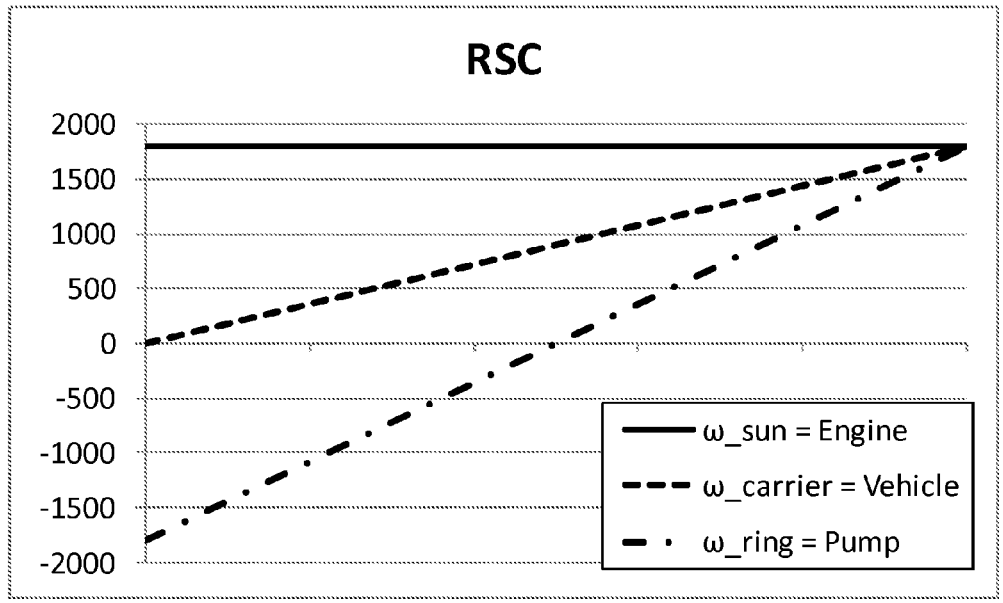
FIG. 11 depicts a graph illustrating the speeds of respective planetary members during vehicle launch when the hydraulic pump/motor is connected to the ring gear and the prime mover is connected to the sun gear, according to embodiments of the present invention.
Figure 12:
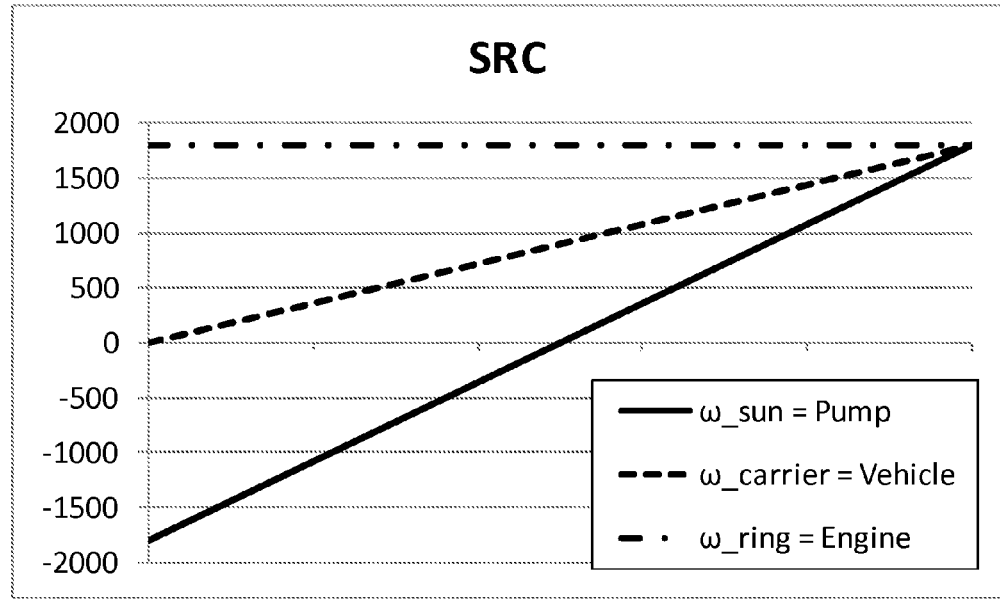
FIG. 12 depicts a graph illustrating the speeds of respective planetary members during vehicle launch when the hydraulic pump/motor is connected to the sun gear and the prime mover is connected to the ring gear, according to embodiments of the present invention.

FIGS. 11 and 12 illustrate speed profiles for two embodiments of the present invention in which the engine speed remains relatively constant while the pump/motor 104 starts at a negative speed and approaches zero due to the reaction torque created by pumping. The reaction torque of the pump/motor 104 allows torque from the prime mover 100 to be transmitted to the driveline, thereby accelerating the vehicle if the torque is high enough. Once the pump/motor speed approaches zero, the torque reaction will diminish, leaving several options to continue the launch. One method, described previously, consists of mechanically preventing the pump/motor 104 shaft from rotating backwards and utilizing the planetary gearset 101 for torque multiplication, while continuing to increase the engine speed and therefore bringing the transmission 102 input speed up. When desired, all of the elements in the planetary gearset 101 can be made to rotate in unison by engaging a clutch 207 that couples two or more elements of the gearset 101 together in a mechanical shift. This is illustrated in FIG. 4. According to other embodiments of the present invention, hydraulic pressure can be used to power the pump/motor 104 to continue to provide torque reaction and aid with the launch, or another gear ratio may be utilized in order to bring the vehicle speed up manually. This is illustrated in FIGS. 11 and 12. When the pump/motor 104 is pumping fluid to create a reaction torque, the resulting hydraulic power can be stored in the accumulator and recovered at a later time.

Figure 13:
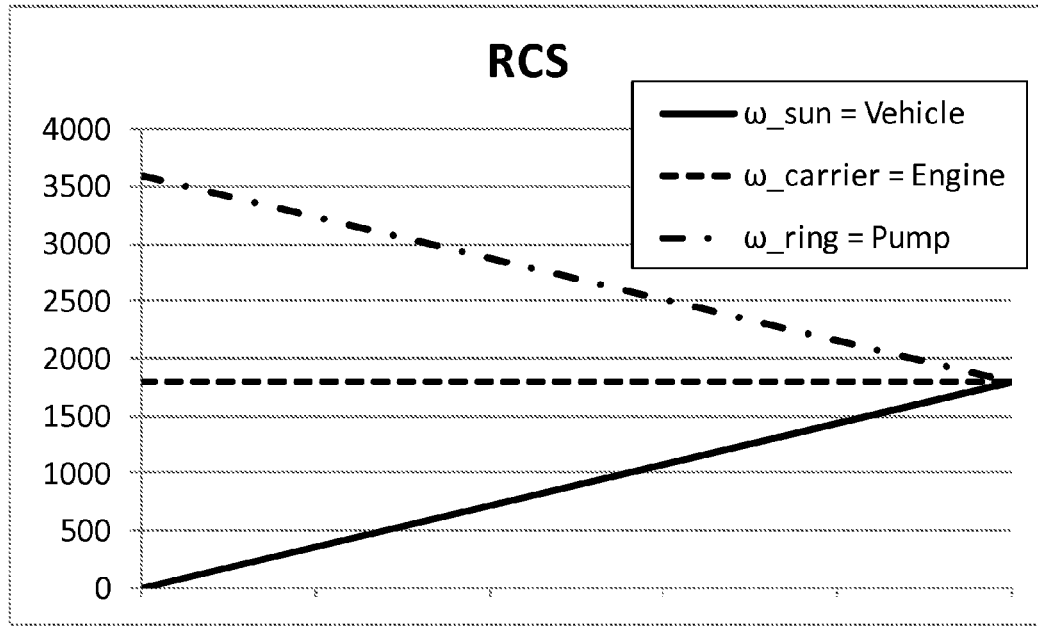
FIG. 13 depicts a graph illustrating the speeds of respective planetary members during vehicle launch when the hydraulic pump/motor is connected to the ring gear and the prime mover is connected to the carrier, according to embodiments of the present invention.
Figure 14:
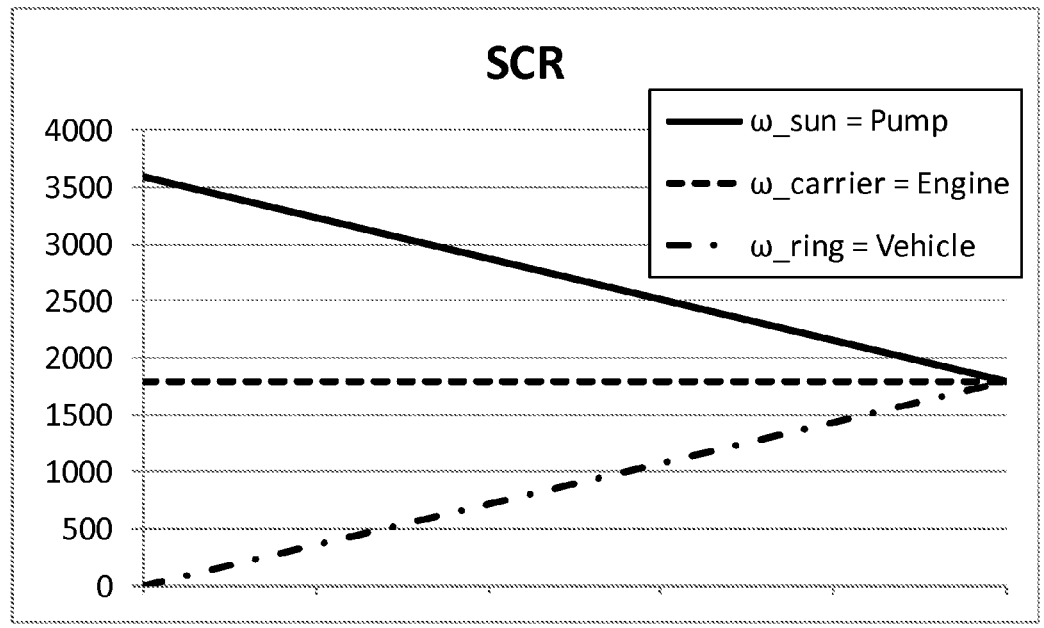
FIG. 14 depicts a graph illustrating the speeds of respective planetary members during vehicle launch when the hydraulic pump/motor is connected to the sun gear and the prime mover is connected to the carrier, according to embodiments of the present invention.

FIGS. 13 and 14 illustrate rotational speeds over time for two embodiments in which the hydraulic branch starts at a higher speed than that of the prime mover and the pump/motor is used to create a reaction torque to allow engine torque to be transmitted to the driveline and/or transmission.

In these configurations, the pump/motor can be decelerated to speeds close enough to the other elements to allow a clutch to be engaged that couples two elements of the planetary system together and causes all of the elements to rotate in unison. The engine speed can be controlled during this time to affect the operation. According to some embodiments, the engine speed and the pump speed are both controlled with the elements operating at different speeds. This can be beneficial for maximizing fuel economy and/or minimizing emissions. These configurations can also be used to store energy while launching the vehicle and be used later to add that energy back into the system after launch.

Figure 15:
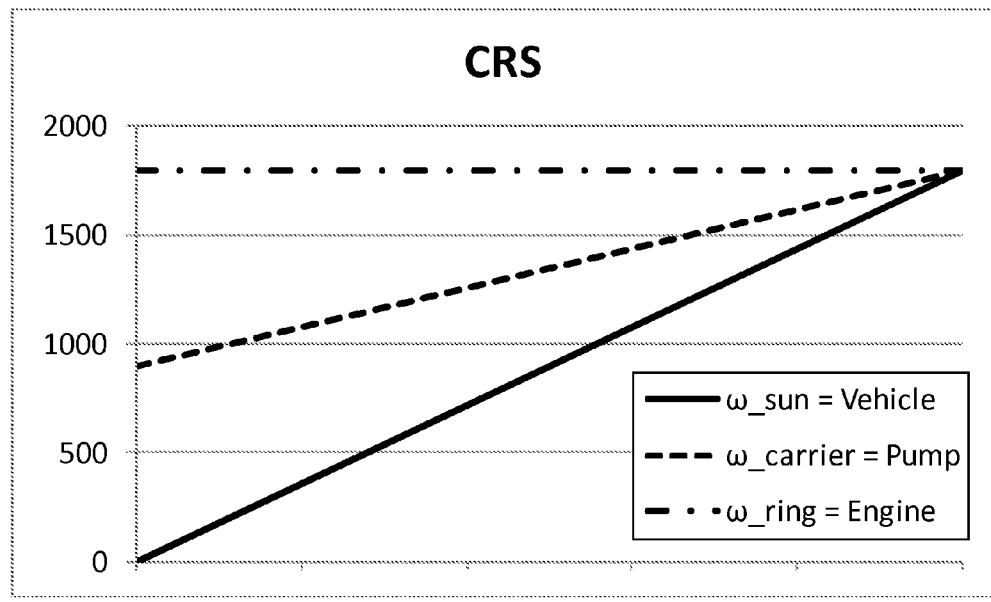
FIG. 15 depicts a graph illustrating the speeds of respective planetary members during vehicle launch when the hydraulic pump/motor is connected to the carrier and the prime mover is connected to the ring gear, according to embodiments of the present invention.
Figure 16:
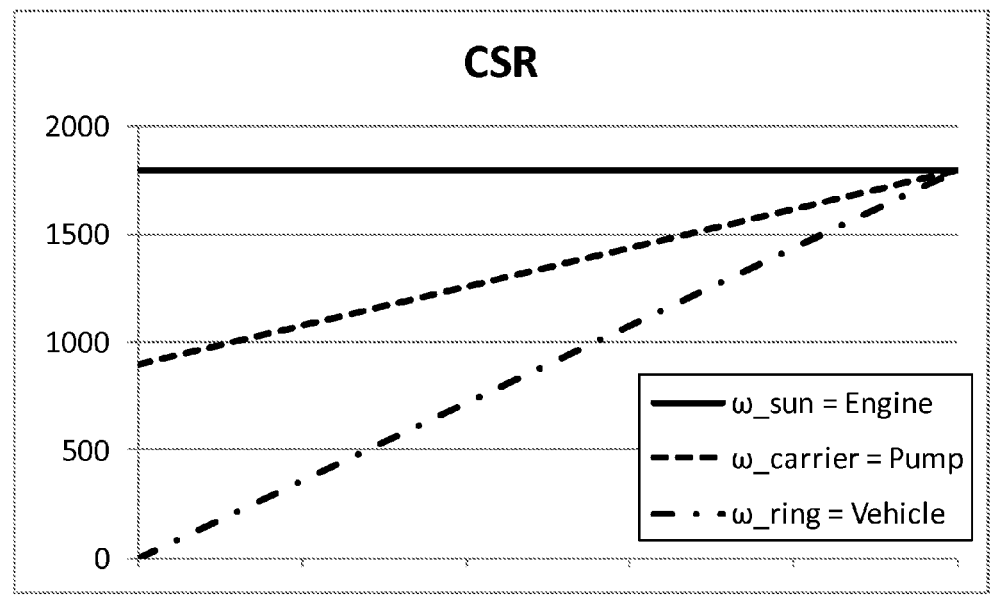
FIG. 16 depicts a graph illustrating the speeds of respective planetary members during vehicle launch when the hydraulic pump/motor is connected to the carrier and the prime mover is connected to the sun gear, according to embodiments of the present invention.

FIGS. 15 & 16 show rotational speeds over time for two embodiments in which the pump/motor starts with a positive speed and is used as a motor to create a reaction torque to accelerate the vehicle.

Figure 17:
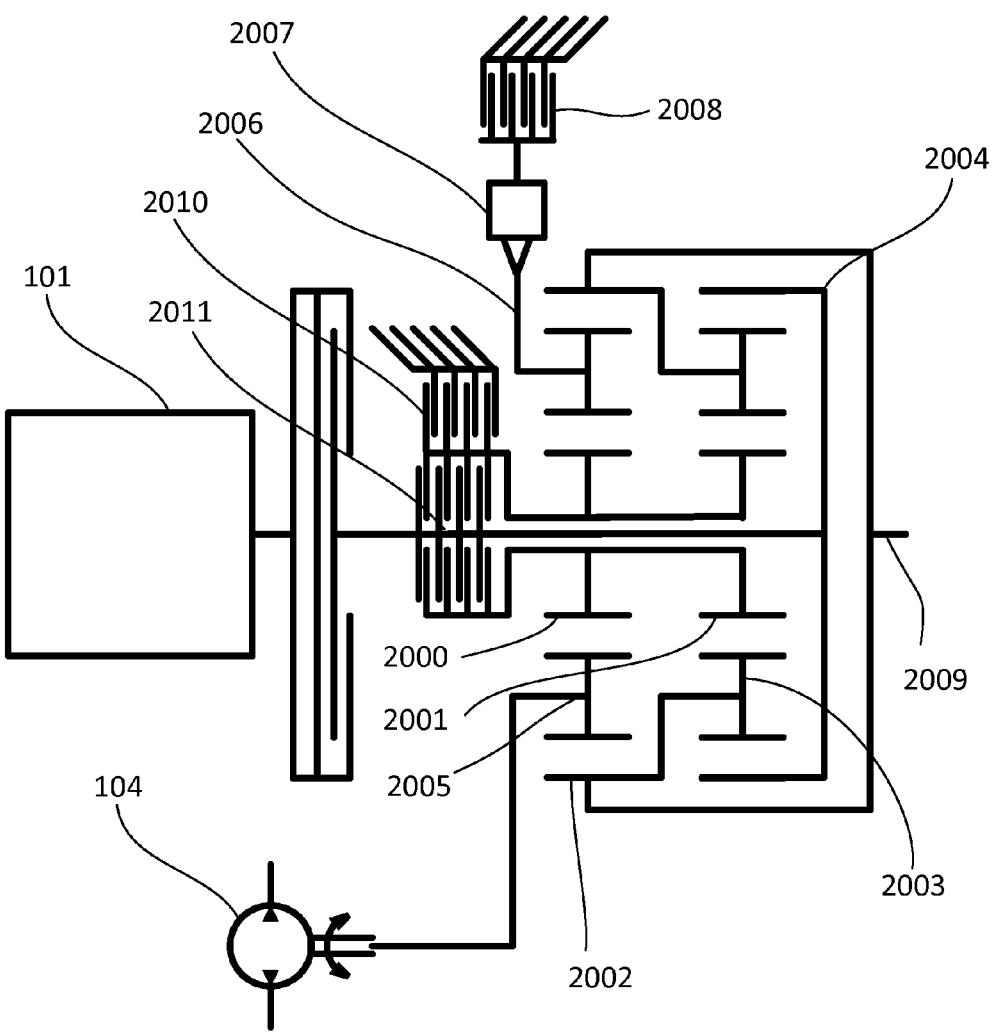
FIG. 17 illustrates a hydraulic hybrid system that is includes two planetary gearsets, according to embodiments of the present invention.

FIG. 17 illustrates a hydraulic hybrid system that employs multiple planetary gear sets to achieve multiple gear ratios and provide launch functionality, according to embodiments of the present invention. This embodiment employs a Simpson planetary gear set, in which the sun gear of the first gear set 2000 is mechanically coupled to the sun gear 2001 of the second gear set and the ring from the first gearset 2002 is mechanically coupled to the planetary carrier from the second gearset 2003. The torque from the engine 100 is applied to the Simpson gearset via the ring on the second planetary gearset 2004, the hydraulic pump/motor unit 104 is connected to the first gearset planetary carrier 2005, and the transmission 102 is attached via the first ring 2002. Other combinations of two or more gearsets may be used to both mix and multiply torques, in addition to the one shown here, according to embodiments of the present invention. According to some embodiments of the present invention, vehicle launch is achieved by allowing the hydraulic unit 104 to spin backwards and operating as a pump to slow the speed of the member 2006 towards zero. In this case, the one way, roller, or sprag clutch 2007 is locked but clutch 2008 is not engaged and the pump/motor 104 can spin backwards freely. While the speed of the hydraulic unit is reduced, the engine rotational speed is held constant with a closed loop speed controller and the reactions drive the output 2009 to an intermediate positive rotational velocity, according to embodiments of the present invention. The gearset may be selected in such a way to have an associated gear reduction for this mode. Once the hydraulic unit is slowed to near zero rotational velocity, clutch 2008 may be applied, preventing the velocity from becoming negative again. The Simpson gearset is now in its "low" mode and the engine speed, and hence the vehicle speed, may be increased to the appropriate level for the shift to the "medium" mode.

According to some embodiments of the present invention, the "medium" mode is achieved by applying clutch 2010. This will accelerate the hydraulic unit off of the one way clutch 2007 and fix the suns 2000 and 2001 to zero rotational velocity. This mode also provides a torque multiplication and speed reduction, but to a lesser extent than the "low" mode, hence the engine speed is dropped during the shifting event. Again, the engine and vehicle may be accelerated until the engine speed requires an additional shift event. In the current embodiment, a third mode that directly transmits rotation and torques can be achieved by releasing clutch 2010 and applying clutch 2011. This clutch couples the sun gears 2000 and 2001 to the second ring 2004, thereby locking the entire Simpson gearset to rotate as one unit. A similar result can be achieved by locking other members of the gearset together to provide direct drive. This "direct drive" mode essentially couples the hydraulic unit directly to the engine and the transmission, providing for multiple modes of operation including both hybrid and non-hybrid modes. With the gearset locked in the medium or direct drive mode, the hydraulic unit can be used as either as a pump or motor for regenerative braking and hydraulic assist. The hydraulic unit may be hard coupled to the first planetary carrier 2005 or selectively coupled through a clutch to remove the unit from the system. According to embodiments of the present invention, a system has a direct drive mode and one or more overdrive modes.

Figures 18, 19:
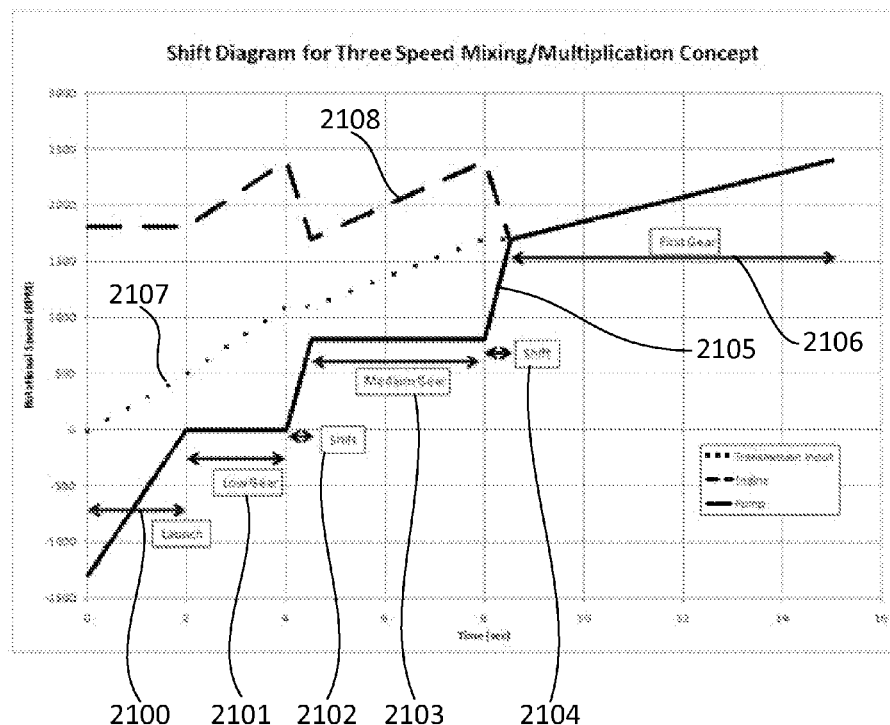
FIG. 18 depicts a clutch diagram for the hydraulic hybrid system of FIG. 17, according to embodiments of the present invention.
FIG. 19 depicts a graph illustrating the launch of the hydraulic hybrid system of FIG. 17, according to embodiments of the present invention.

FIG. 18 illustrates a clutch diagram for the embodiment of the three speed Simpson planetary mixing/multiplying hybrid system shown in FIG. 17.

FIG. 19 depicts a graph illustrating the rotational velocity diagram for an embodiment of the present invention with three speeds. The modes as described with respect to FIGS. 17 and 18 are shown, along with the speeds of the planetary members that are directly or indirectly attached to the pump/motor, vehicle, and engine. The launch mode 2100 shows how the hydraulic unit 104 is slowed to zero speed and transitions into the low mode 2101. Next, a shift 2102 switches to medium mode 2103, and lastly, a second shift 2104 makes the unit rotate together in a direct drive mode 2105.

The dynamics involved with shifting ratios in a vehicle can cause vibrations in the powertrain and driveline that are both undesirable from a driver or passenger comfort viewpoint and can be detrimental to the hardware. Because of this, it is not uncommon for vehicles with lock up torque converter clutches (TCC) to unlock, or partially unlock, the TCC and allow the fluid coupling and/or slipping TCC to attenuate the vibrations when shifting. Similarly, the TCC in torque converters and clutch discs in manual transmission systems and automatically shifted manual transmissions, and couplings in CVTs, usually include a torsional damper or some other mechanism to attenuate driveline vibrations. As previously mentioned, a wide variety of devices are used for this in conventional applications and are applicable to embodiments of the present invention as well.

Many powertrain control system algorithms employ engine management strategies which alter the torque of the engine when a shift is being performed, and those control methods may be employed with embodiments of the present invention. These engine and transmission systems may be integrated into the same controller, or multiple controllers, and may communicate with each other in a variety of ways, including, but not limited to, serial buses, dedicated wires, wireless communications, and the like.

According to embodiments of the present invention, one or more of the clutches associated with the mixing planetary gearset in the hybrid system and/or the transmission if a separate system, can be controlled to affect the disturbance created by a shift and/or affect how much of that disturbance will be transmitted to the rest of the driveline and powertrain. Additionally, in retrofit applications, it may be advantageous to communicate with the transmission and/or powertrain controller to adjust or disable diagnostics or parameters that could be affected by the hybrid system.

Figure 20:
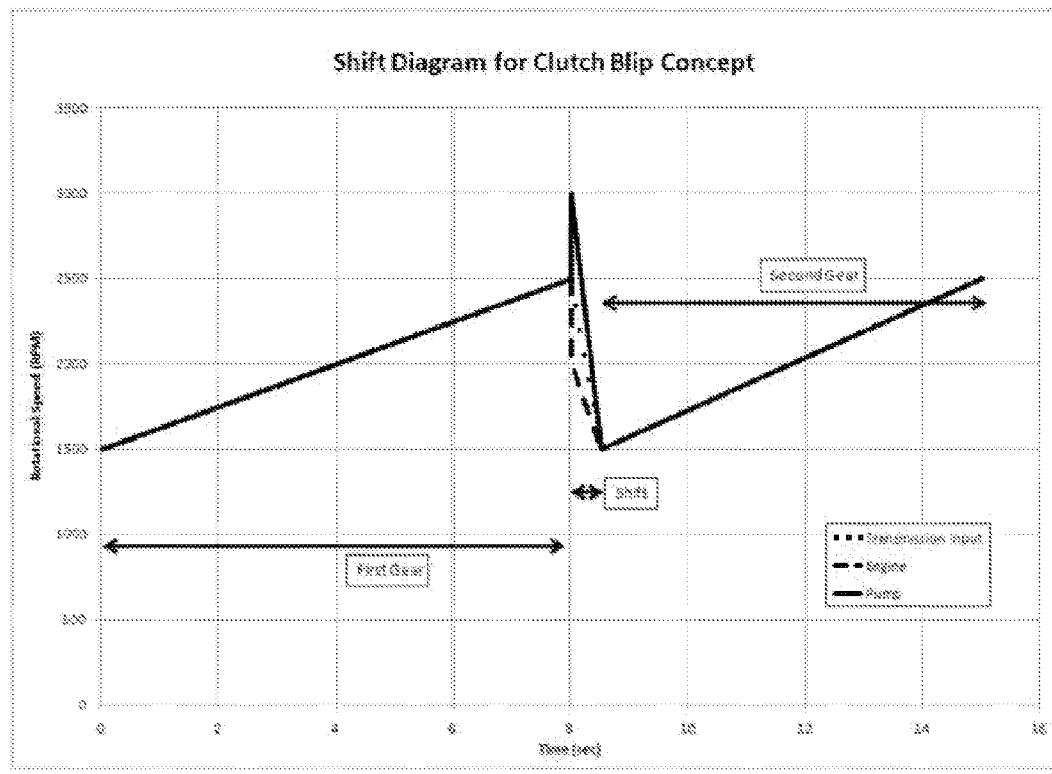
FIG. 20 depicts a graph of speed profiles of the planetary components during a shift made using a method for smoothing out shifts made in a vehicle without a torque converter, according to embodiments of the present invention.

FIG. 20 represents a graph of the speeds of the different elements of the gearset as a function of time when the transmission is undergoing a typical shift such as from $1^{st}$ gear to $2^{nd}$ gear, or from $2^{nd}$ gear to $3^{rd}$, for example. According to embodiments of the present invention, clutch 207 can be released for a brief instance, perhaps 200-1000 msec, to allow the pump/motor 101, to accelerate and smooth out the shift. By controlling the speed and pressures on the pump and/or the torque capacity of the clutch 207, the torque disturbance of the shift and therefore the loads generated can be attenuated.

According to embodiments of the present invention, the hydraulic hybrid system can be used to for "stop-start" applications where the prime mover is shut off for periods of time. In one mode of "stop-start" operation, the input to the transmission can be prevented from rotating in multiple ways by applying multiple clutches to mechanically lock or "bind up" the transmission so that it cannot rotate, by applying a brake and/or clutch that couples the input shaft to the ground and having the transmission in gear, and/or by applying a parking brake or other means to prevent the drive wheels from rotating, according to embodiments of the present invention. Once the input shaft to the transmission is prevented from rotating, torque from the pump/motor can be used to rotate the engine and start it. According to other embodiments, the vehicle inertia can be high enough such that, if the vehicle is in gear, the engine will rotate with less resistance and start when torque is supplied by the pump/motor. In other situations, an electric starter can be used to start the engine.

According to other embodiments of the present invention, when the engine has been stopped it can be prevented from rotating in various ways, including the non-limiting example of a clutch or brake attached to the engine shaft that grounds the engine shaft to the block. Once the engine shaft is prevented from rotating, the hydraulic pump/motor can be used to propel the vehicle forward using stored hydraulic fluid, and can be used to recover braking energy slowing the vehicle down.

According to some embodiments of the present invention, this arrangement would allow a vehicle to decelerate from speed with the engine off using the hydraulic pump/motor to recover the kinetic energy of the vehicle and store it in the accumulators. If the vehicle needs to move around or creep, the hydraulic power is available to do that using the hydraulic pump/motor with the prime mover off. Furthermore, if auxiliary hydraulic loads are required, they can be provided for using the stored energy without turning the engine on. It is possible to accelerate the vehicle and/or start the engine using the stored hydraulic power.

Hydraulic control fluid for the clutches can come from a variety of sources including one or more of the following non-limiting examples: an engine driven pump, a transmission input shaft driven pump, a transmission output shaft driven pump, an electrically driven pump, an accumulator, a pressurized reservoir, and the like.

According to embodiments of the present invention, the gearset 101 can be of designs other than a planetary or epicyclic, yet perform similar functionality in which the speed of one element is a function of two or more other elements. For example, a differential in which the pump/motor, prime mover and transmission input can be connected to the two side gears and the differential housing, in a variety of configurations, may be used.

According to embodiments of the present invention, various mechanisms can be used to couple the pump to the gearset which is also coupled with the engine or prime mover. Examples of this include, but are not limited to, metal chains, polymer chains and/or belts, sprockets, gears, shafts and hydraulic systems. Furthermore, the coupling 105 may be of fixed or variable ratio design such as a continuously variable transmission, a hydrostatic transmission, electric motor/generator set, and the like. Based on the disclosure provided herein, one skilled in the art will appreciate the numerous other methods to transfer the torque between the planetary gearset and the pump/motor.

According to some embodiments of the present invention, the system may incorporate a torque converter and the gear set may be located between the torque converter output (turbine) and the input to the transmission or driveline. In other embodiments, the planetary gear set may be located between the output of the engine and the input to the torque converter (pump). Other embodiments of the present invention are used in conjunction with a manual type transmission that may, or may not, be automatically shifted. In these embodiments, the gearset may be located between the engine output and the input to the one or more clutches used to selectively couple the engine torque to the transmission, and in other embodiments the gearset is located between one or more of the clutches and the transmission input. Still other embodiments of the present invention may be used with other powertrain configurations including, but not limited to, a CVT, a transfer case, no fixed ratio transmission, a single reduction ratio, a differential and a direct drive. In all of these examples, the gearset may be located between the engine and any driveline damper assembly or between the driveline damper assembly and the downstream driveline.

According to embodiments of the present invention, the electronic controls for the clutches, valves, sensors or any other components that can be sensed, actuated or used in the control of the system can be coordinated with other control algorithms in the vehicle, including but not limited to, the engine controller, the transmission controller, anti-lock brake controller, vehicle dynamics controller, and the like. Coordination and communication of the various control algorithms can be accomplished in a variety of ways including the non-limiting examples of integrating the control algorithms into the same controller or using multiple controllers that communicate with each other in a variety of ways, including but not limited to serial buses, dedicated wires, wireless communications and the like. Based on the disclosure provided herein, one of ordinary skill in the art will recognize the many different ways to coordinate a plurality of control algorithms to achieve the desired result, and the examples listed are intended to be non-limiting. In cases where a torque converter is used and contains a TCC, it can be advantageous to take control of the TCC and this can be done using the methods outlined above, and/or by having the hybrid controller control the actuation of the TCC directly.

Embodiments of the present invention integrate a through-shaft pump/motor, or pump/motor with through-shaft functionality, with a gear set that allows torque multiplication between the pump/motor and the through-shaft. Some embodiments also permit the torque multiplication ratio to be changed between more than one ratio. Some embodiments of the present invention effectively decouple the pump/motor from the system such that there are few, if any, parasitic losses when the system is not engaged. According to some embodiments of the present invention, the elements for pump/motor functionality, the elements for through-shaft functionality, and any other elements are packaged within a common housing. According to other embodiments of the present invention, some or all of the valving and other hydraulic elements are also situated within the common housing. According to some embodiments of the present invention, the common housing also includes an integrated sump that holds a portion of the operating fluid.

As used herein, the term "pump/motor" is used in its broadest sense to refer to a device that operates either as a pump or a motor or a device that can operate as both a pump and a motor.

Figure 21:
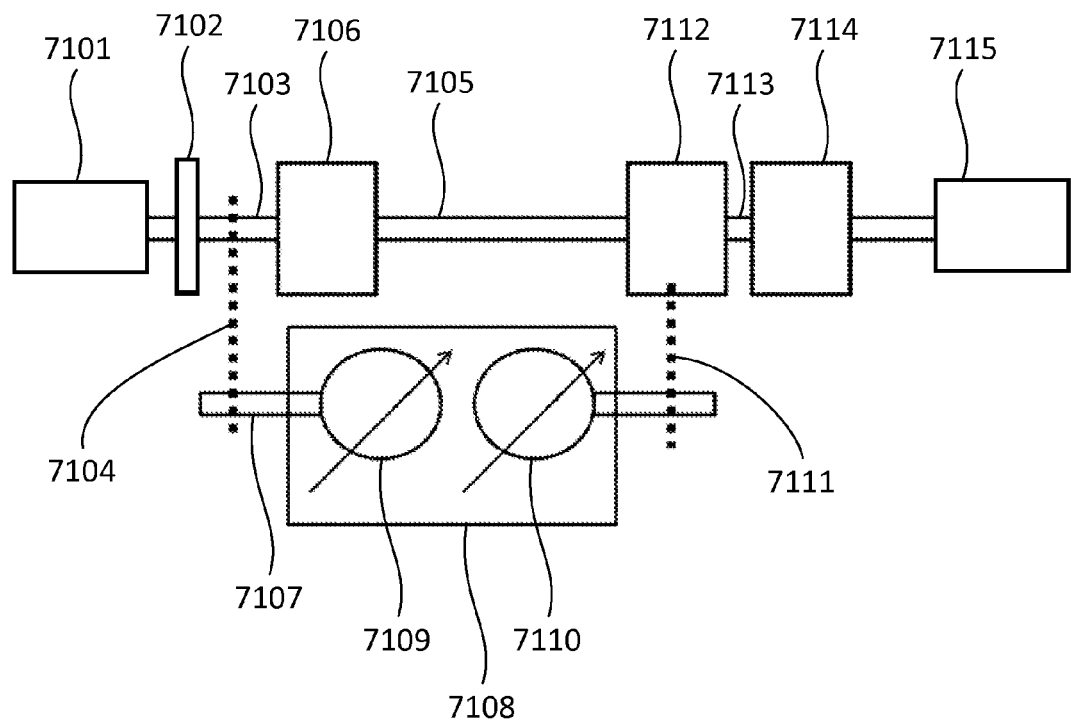
FIG. 21 illustrates an input coupled torque split hydrostatic transmission, according to embodiments of the present invention.

FIG. 21 illustrates a vehicle powertrain that utilizes an input coupled, torque split hydraulic hybrid transmission according to some embodiments of the present invention. The system is comprised of the prime mover or engine 7101, which transmits power to an input shaft 7103 through torsional damper 7102. The damper 7102 is used to attenuate vibrations generated by the engine firing events from by the rest of the powertrain. The damper 7102 may be comprised of one or more of: helical springs and friction elements, viscous coupling elements, dual mass flywheels, friction elements designed to have some slippage, active elements that control the amount of friction between the input and the output, special lubricants and/or friction modifiers. The damper 7102 may also be in a predominantly dry environment or may be immersed or in regular contact with a lubricating or working fluid such as automatic transmission fluid, hydraulic fluid, engine operating oil, or the like. In some cases, no damper assembly 7102 is present, and the engine output is instead coupled directly to the input shaft 7103 or to the input shaft 7103 through a clutch (not shown). Elimination of the damper assembly 7102 may lead to increased vibrations in certain operating modes.

According to some embodiments of the present invention, the input shaft 7103 is coupled to the input of a planetary gear set 7112 either directly via shaft 7105, or through a clutch (not shown) or through a gear set, planetary gear train, belt drive, chain drive, or other mechanism 7106 capable of magnifying or reducing the speed ratio between the input and output shaft 7105. This path may be referred to as the "mechanical path." This gear multiplication or reduction may be used to provide the speed and torque characteristics required for other components in the system. Also coupled to the input shaft 7103 is a sprocket and chain, belt, spur gear, or other mechanism 7104 used to transmit power between the shaft 7103 and the input to a hydrostatic transmission or variator or other mechanism 7107 to adjust the input/output relationship. This path may be referred to as the "hydraulic path." The variator or hydrostatic transmission can be comprised of a single unit or can be comprised of a separate pump/motor attached to the input shaft and a separate pump/motor attached to the output shaft with the required hydraulic hoses, manifolds, valves or other hardware to make the two units function as a hydrostatic transmission, or any other configuration that provides substantially the same function.

According to some embodiments of the present invention, a planetary gear set 7112 or the like is used to couple some or all of the power to, or from, the engine 7101 being transmitted via shaft 7105 and power transmitted to, or from, the hydrostat via chain, gear set, or other means 7111, and the connection 7113 between the gear set 7112 and the transmission or other gear set 7114.

The power carried in the hydraulic branch 7107 is carried into the hydrostat 7108. Within the hydrostat, power is carried into a first hydraulic pump/motor 7109 which in one embodiment may be an axial piston pump/motor, but many other types of positive displacement pumps could be used. Through a series of pipes and valves not shown in FIG. 21, power flows through a second hydraulic pump/motor 7110 in the hydrostat, which also can also be an axial piston pump/motor, or other positive displacement pump/motors. Power at the output of the hydrostat is carried through a gear ratio, or other form of torque reduction or amplification 7111 and into one of the three elements (sun, ring, planet carrier) of a simple planetary gear 7112. Gear ratio 7111 can be a sprocket and chain or belt, a planetary gear, or spur gears, for example. At the planetary 7112 the mechanical branch 7105 and the hydraulic branch 7107 are recombined by attaching one element in the planetary to the mechanical branch, one element to the hydraulic branch, and the third element to the output shaft 7113. During steady state operation, the torque carried on each branch is defined by the torque carried by the output and by the geometry of the planetary gear. The speeds of two elements in the planetary may be used to determine the speed of the third element, according to embodiments of the present invention. The output shaft 7113 is also the input shaft to the gear ratio 7114 or other mechanism to reduce or amplify the speed and torque, which may be a single gear ratio or a gear box containing several gears. Finally, the power is transmitted to the output 7115. The output is the driveshaft or a connection to the transmission to the vehicle, for example.

During the process of launching the vehicle it may be desirable to regulate the torque and/or the speed of the engine such that the torque created in the hydraulic branch and the mechanical branch are in correct proportions. Similarly, the torque generated in the pump/motor 7110 and the torque of the engine 7101 may be controlled, according to an embodiment of the present invention.

Figure 22:
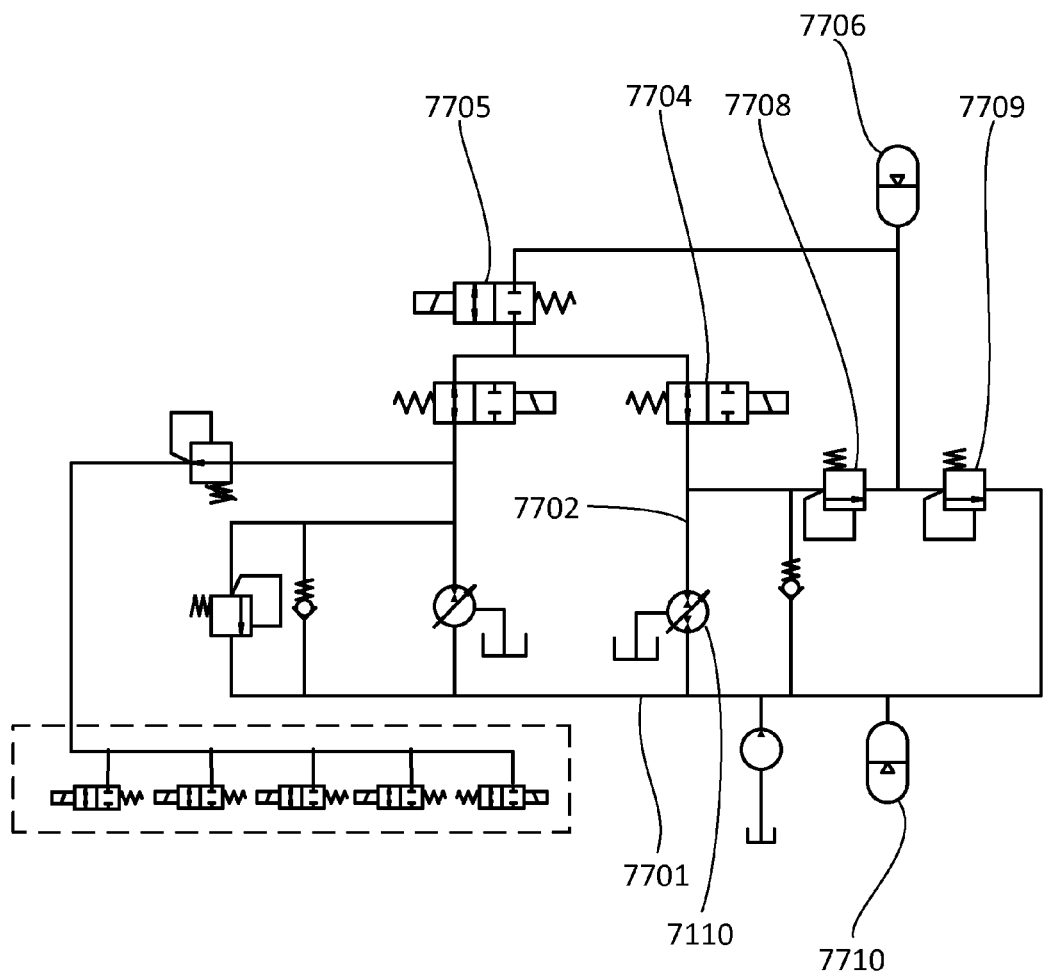
FIG. 22 illustrates a hydraulic schematic for a torque split transmission in a launch condition, according to some embodiments of the present invention.

To achieve launch, fluid may be pumped through the second hydraulic pump/motor 7110 to the relief valve 7708 in FIG. 22. As the fluid flows through the relief valve 7708, the high pressure accumulator 7706 begins to fill. This system allows the high pressure fluid to be stored for later use in assisting the vehicle launch. In this case, some of the power that would normally be lost in a torque converter or mechanical clutch launch is captured for later use. Once the high pressure accumulator is filled to its maximum pressure, fluid begins to flow over the relief valve 7709 back to the low pressure accumulator 7710. Additional valving (not shown) may be employed to route fluid from the relief valve 7708 back to the inlet side of the pump/motor 7110, which is connected to the low pressure accumulator 7710 in this embodiment, rather than the high pressure accumulator 7706.

The flow restriction 7708 creates the torque in the pump/motor 7110 by restricting the output flow and can be created through any sort of restriction device such as a valve or an orifice. If the pressure in the accumulator is sufficiently high, there may be no need to restrict the fluid through the pump/motor device, but the output flow of the pump can be routed directly to the high pressure accumulator 7706. According to some embodiments of the present invention, the flow can be routed through valves 7704 and 7705, where pressure is developed as the volume of hydraulic fluid increases in the accumulator. According to other embodiments of the present invention, the output of the pressure relief valve 7708 is plumbed directly back to the low pressure side rather than to the high pressure accumulator 7706.

Once the vehicle speed has increased to a point at which the system no longer needs to dissipate extra power, hydrostat mode begins, according to embodiments of the present invention.

Figure 23:
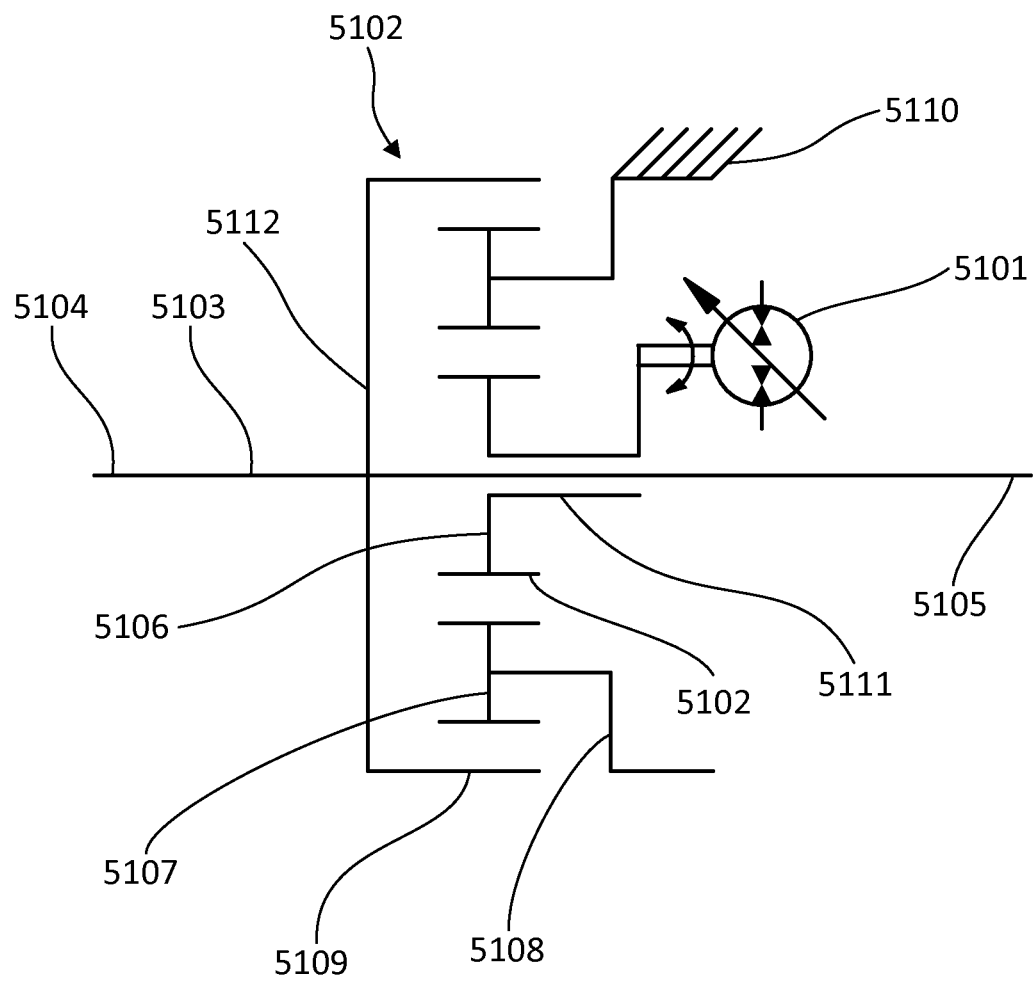
FIG. 23 illustrates a diagram of a system that is comprised of a hydraulic pump/motor and an epicyclic gear train in which the pump/motor is connected to, or is part of, the sun gear, the planetary carrier is grounded, and the ring gear is connected to the through-shaft, according to embodiments of the present invention.

FIG. 23 illustrates a diagram of a hydraulic pump/motor 5101 and a gear set 5102 used to couple torque between the pump/motor and a shaft 5103, according to some embodiments of the present invention. In some embodiments, the shaft 5103 is coupled at end 5104 to a source of torque such as, but not limited to, the output of a transmission, transfer case, engine, torque converter, or other prime mover or power transmission device. In certain modes of operation these devices may absorb torque from the shaft 5103, and in other modes no torque is transmitted at all.

The device also has another shaft end 5105 that is connected to a load device such as, but not limited to, the input of a differential, transmission, transfer case, torque converter, or other power transmission device. In certain modes of operation these devices may supply torque to the shaft 5103, and in other modes no torque is transmitted at all.

The shaft 5103 may be continuous and of such design that substantial amounts of torque can be transmitted from end 5104 to end 5105 and vice-versa. In some embodiments of the present invention, this shaft handles as much, if not more, torque than the original driveshaft of the system. Alternatively, the shaft may be made of multiple pieces, but have operational modes in which it acts as one common shaft, such that large amounts of torque can be transmitted between end 5104 and 5105 and vice-versa.

In certain embodiments, the gear train is comprised of an epicyclic, or planetary, gear set 5102 that is comprised of a sun gear 5106, one or more planet gears 5107, a planet carrier 5108, and a ring gear 5109. According to some embodiments of the present invention, one of the members (sun gear, carrier or ring gear) of the epicyclic gear set may be coupled directly to, or be part of, the pump/motor such that the pump/motor 5101 and the element rotate together as one unit and torque is readily passed back and forth between the two. In FIG. 23, the sun gear 5106 is connected to the pump/motor 5101 via connection 5111. Connection 5111 may take on many forms and may be, but is not limited to, a solid shaft, a coupling, a spline, extra material, a dog clutch, or a hollow shaft of dimensions that would permit shaft 5103 to pass through the inside dimensions of it with little if any contact between the two. In some embodiments one or more bearings, bushings, spacers, rollers, or other low friction devices may be used to transmit radial and axial loads between the shaft, without transmitting tangential loads or torques.

FIG. 23 also illustrates that one of the members of the epicyclic gear set, in this case the planetary carrier 5108, may be coupled to the housing, or another reaction 5110, such that it cannot rotate appreciably relative to it. The ring gear 5109 is coupled to the shaft 5103, which is indicated by 5112 in FIG. 23, such that the torque of the ring gear can be transmitted between the ring gear and shaft in both directions.

In one mode of operation the pump/motor receives high pressure fluid and operates as a hydraulic motor. In this case the torque of the pump/motor 5101 is transmitted through connection 5111 to the sun gear 5106. The torque applied to the sun gear 5106 is reacted by the planetary gears 5107 which is, in turn, reacted by the ring gear 5109 which is attached to the output shaft 5103, such that large amounts of torque can be transmitted between the two. In this embodiment, the carrier 5108 is prevented from rotating by the reaction 5110 causing the ring gear 5109 to rotate. This arrangement results in the torque output from the pump/motor 5101 being multiplied by the gear train 5102 to provide a larger torque input at lower speed to shaft 5103, according to embodiments of the present invention.

In other modes of operation of the system of FIG. 23, the pump/motor 5101 operates as a pump and absorbs torque from the gear train 5102. In this mode, torque from the shaft 5103 is transmitted to the ring gear 5109, which is reacted by planet gears 5107, which are reacted by the sun gear 5106 connected to the pump/motor 5101.

The system illustrated in FIG. 23 has numerous advantages over existing systems including, but not limited to, smaller packaging, higher power density and better efficiency due to the lighter weight.

Such a system would lend itself very well to hydraulic hybrid vehicles, but could have other applications including, but not limited to, agricultural machinery, mining equipment, construction equipment, mobile hydraulic, industrial equipment, and robotics.

Figure 24:
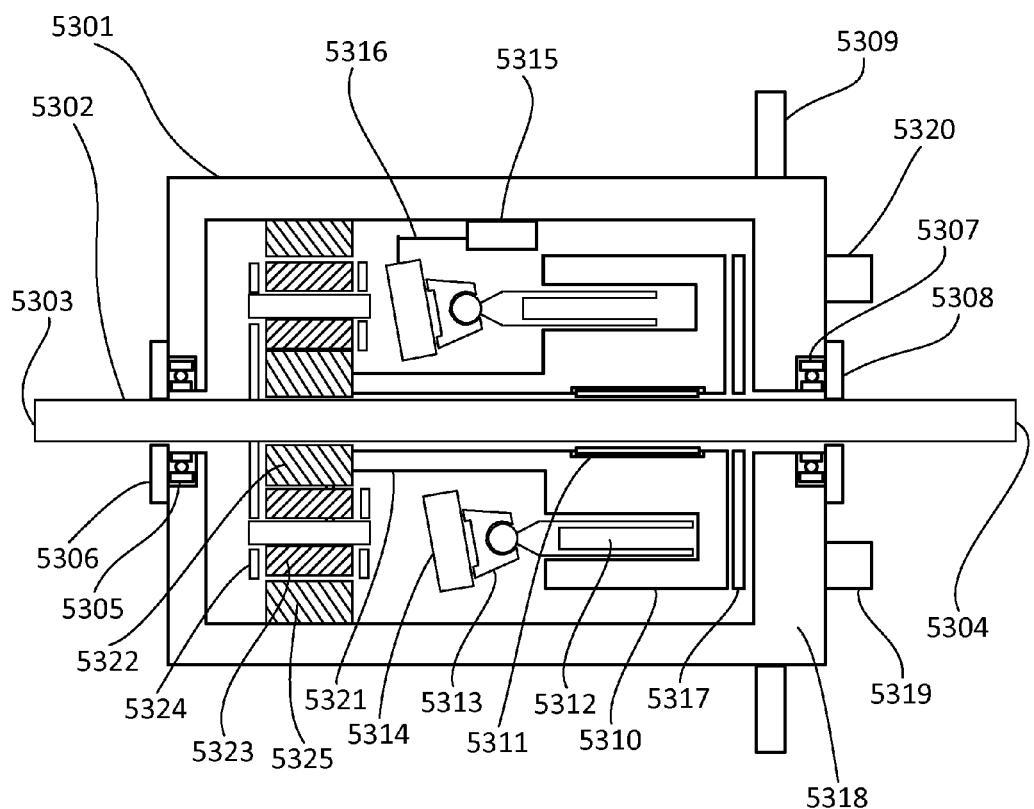
FIG. 24 illustrates a diagram of a system that is comprised of a hydraulic pump/motor and an epicyclic gear train in which the pump/motor is connected to, or is part of, the sun gear, the ring gear is grounded, and the planetary carrier is connected to the through-shaft, according to embodiments of the present invention.

FIG. 24 illustrates a cross-sectional view of another embodiment of the present invention. The system of FIG. 24 is functionally similar to that of FIG. 23. In the system of FIG. 24, a housing 5301 contains the integrated pump/motor and gearbox system along with other system hardware. The housing 5301 may be constructed from a wide variety of materials including, but not limited to, steel, aluminum, magnesium, iron, or other materials known to one of ordinary skill in the art, and may be constructed from various processes including but not limited to casting, forging, welding or using adhesives to form it from plates, machining from billet and other processes known to one of ordinary skill in the art. A shaft 5302 enters one end of the housing 5301 at end 5303 and extends through the entire housing until it protrudes through the other end of the housing at shaft end 5304. The shaft has sufficient dimensions and material and material processing selections that it can safely withstand the loads experienced by the driveshaft, or other location where it will be used with adequate factor of safety. The shaft may be comprised of multiple pieces, but act as a single shaft some or all of the time. Bearings, bushings, or other low friction devices 5305 are used at one or more locations to support the shaft such that it can rotate freely, but is constrained in the radial and/or tangential direction. Different bearings in different locations may have different purposes. One or more seals 5305 are used to minimize the transfer of liquids in or out of the housing. Various different seals can be used including, but not limited to, lip seals, rotating face seals, rope seals, o-rings, formed polymer seals, and numerous other designs known to one of ordinary skill in the art. The housing 5301 may include features 5309 that allow the housing to be mounted in the application, according to some embodiments of the present invention.

Inside the housing 5301 is a pump barrel or cylinder block 5310 that houses one or more pistons 5312 that are used to provide pump/motor functionality. The cylinder block 5310 may be mounted on one or more bearings, bushings, coatings or other low friction devices that allow it to rotate freely but maintain the proper alignment in the housing. These low friction devices may be located between the shaft 5303 and the cylinder block 5310 as shown in FIG. 24, or they may be located in other locations such as, but not limited to, between the cylinder barrel 5310 and the housing 5301.

According to some embodiments of the present invention, the pistons 5312 are attached to slippers 5313 by means of ball or other joint type that rides on a swashplate 5314. However, this functional operation can be achieved using many different pump/motor technologies, and the particular design illustrated is exemplary and non-limiting. The swashplate 5314 may be configured such that it can pivot or rotate and thereby change the displacement of the pump/motor using actuator 5315 acting through connection 5316. Other pump/motor systems may not include a swashplate, and may be of fixed displacement, or use other means to adjust the displacement. The pump/motor includes one or more valve plates 5317 that are adjacent to the cylinder head 5318 which may be part of the housing itself, or secured to the housing normal fastening and other manufacturing methods.

Fluid connections 5319 and 5320 are used to supply fluid to and from the system. Other hydraulic connections may be employed, for purpose such as, but not limited to, cooling, leakage, filtering, and control pressure.

A connection 5321 is used to transmit torque between the cylinder block 5310 and the sun gear 5322. This connection may take on many forms including, but not limited to, a hollow shaft, pins, rods, a coupling, a clutch, part of or an extension of the cylinder block 5310, a torsional spring, and other functionally equivalent or similar designs or mechanisms. According to embodiments of the present invention, the sun gear 5322 transmits torque to and from one or more planet gears 5323, which have reactions from the ring gear 5325 and the planet carrier 5324, which is coupled to, or is part of, the shaft 5302 such that the two do not rotate appreciably relative to each other.

According to some embodiments of the present invention, the ring gear 5325 is coupled to the housing such that it cannot rotate appreciably relative to it (e.g. such that the ring gear 5325 is substantially prevented or inhibited from rotating with respect to the housing). In some embodiments, the ring gear 5325 is always prevented from rotating, and in other embodiments the ring gear 5325 may be selectively allowed to rotate to effectively decouple the transfer of torque between the pump/motor and the shaft 5303. Many different members can be used to function as a clutch and selectively couple the torque between the ring gear 5325 and the housing 5301, including, but not limited to, wet plate clutches, dog clutches, dog clutches with synchronizers, synchronizers, dry clutches, band brakes, pins that engage both the ground and the ring gear, cone clutches, disc brakes, electromagnetic brakes, and other functionally equivalent or similar devices recognized by one of ordinary skill in the art, based on the present disclosure.

Figure 25:
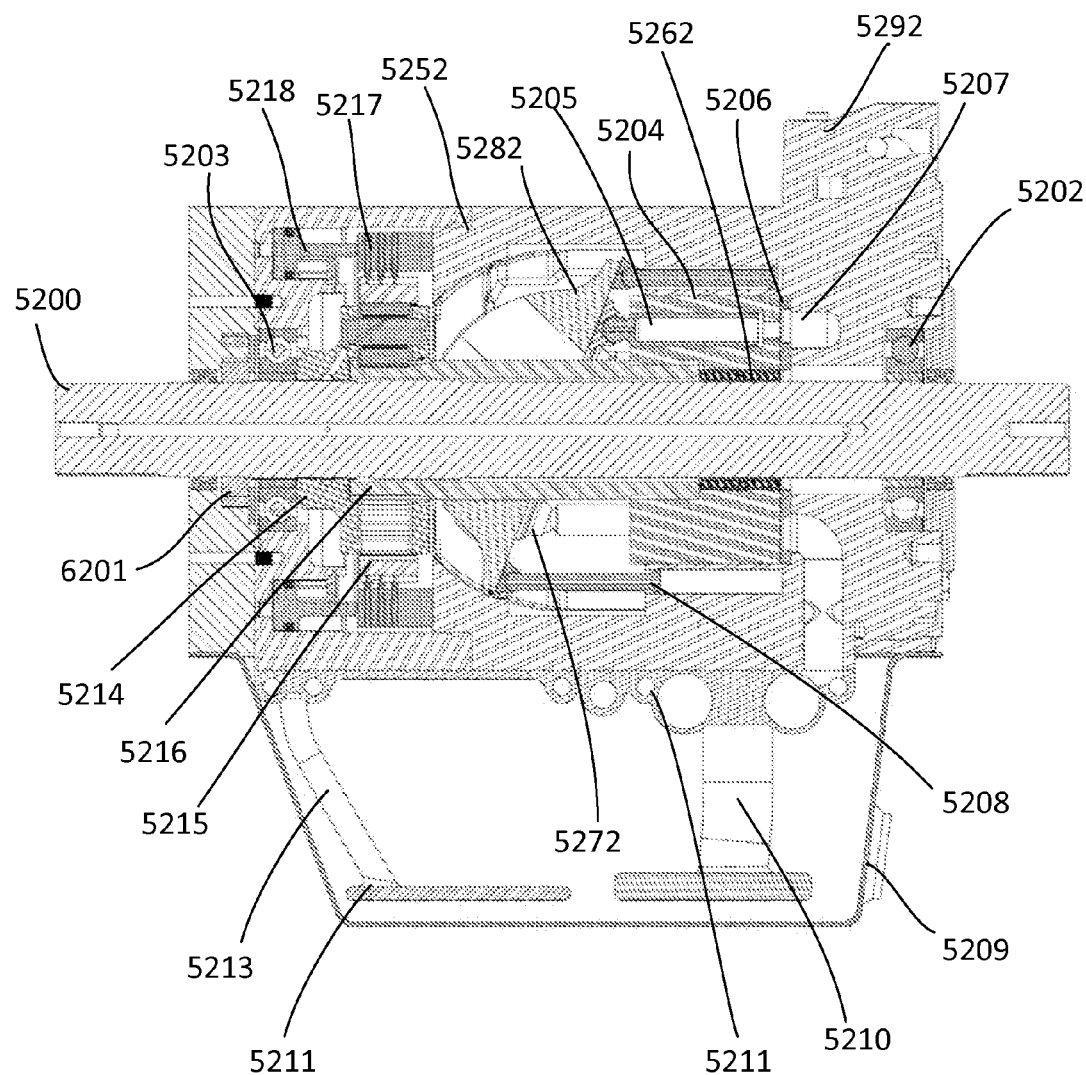
FIG. 25 illustrates a cross-sectional view of an integrated hybrid system that is comprised of a hydraulic pump/motor and an epicyclic gear train in which the pump/motor is connected to the sun gear, the ring gear is grounded to the housing, and the planetary carrier is connected to the through-shaft, according to embodiments of the present invention.

FIG. 25 illustrates an embodiment of the present invention. A shaft 5200 is mounted in a multi-piece housing 5252 and is supported by bearings 5202 and 5203 such that it can rotate freely. A pump barrel 5204 rotates on bearing 5262 which in turn rotates upon the shaft 5200. The pump barrel has a plurality of pistons 5205 that can translate in and out of the bores in the cylinder barrel. The pistons have shoes 5272 that slide upon the swash plate 5282. The barrel is contact with a valve plate 5206 that contacts the end housing 5292 that has ports 5207 in it. The angle of the swashplate is controlled by pistons 5208. The assembly incorporates a valve body 5211 that is contained inside the pan 5209. The high flow area pickup 5210 is used to draw fluid from the pan and into the main pump. The small pickup 5211 is used to pick up oil for the smaller control pressure circuit pump 6201 that pulls the fluid up through pickup 5213.

The shaft 5200 is splined to accept a carrier 5214 that has planet gears that rotate on the carrier pins and remain in contact with the sun gear 5216 and the ring gear 5215. Clutch 5217 is used to couple the ring gear to the housing and provide a reaction torque for the system. The clutch is actuated by hydraulic fluid acting on piston 5218.

According to embodiments of the present invention the clutch 5217 can be engaged to couple the ring gear to the housing and thereby create a reaction torque allowing the torque generated by the pump be multiplied and transmitted to the shaft 5200. Disengaging the clutch allows the driveline to be uncoupled from the hydraulic pump/motor.

Figure 26:
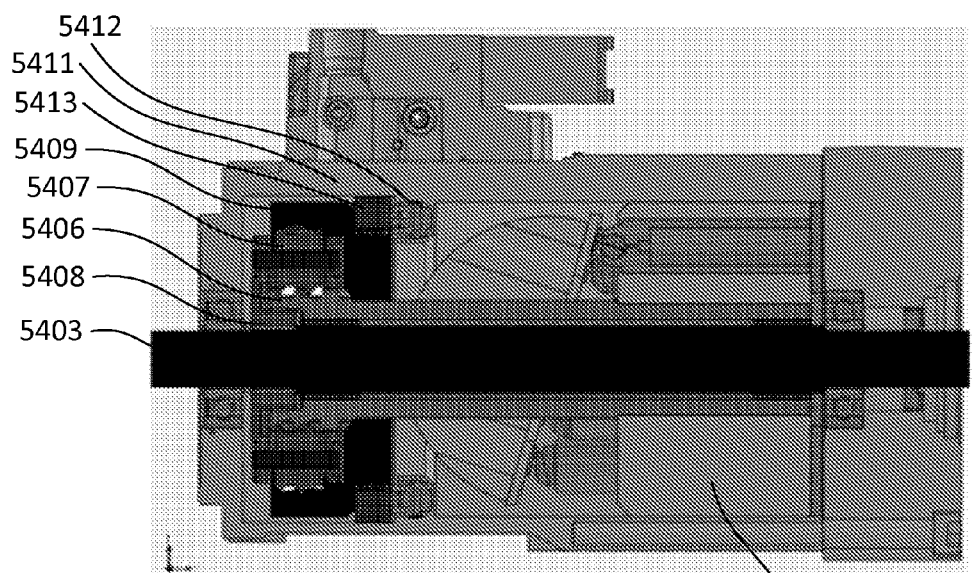
FIG. 26 illustrates another cross section of an integrated system that is comprised of a hydraulic pump/motor, an epicyclic gear train in which the pump/motor is connected to the sun gear, the ring gear is connected to a multi plate clutch that selectively connects it to the housing and the planetary carrier is connected to the through-shaft, according to embodiments of the present invention

FIG. 26 illustrates a cross-sectional view of an integrated system, according to embodiments of the present invention. According to some embodiments of the present invention, a cylinder block 5401 is coupled to a sun gear 5406 which is in turn in mesh with one or more planet gears 5407 that also mesh with ring gear 5409. The planet gears are coupled with carrier 5408 which is coupled to the shaft 5403. According to some embodiments of the present invention, a multi-plate wet clutch 5413 couples the ring gear 5409 with the housing 5411 and is actuated by a hydraulic piston 5412.

Figure 27:
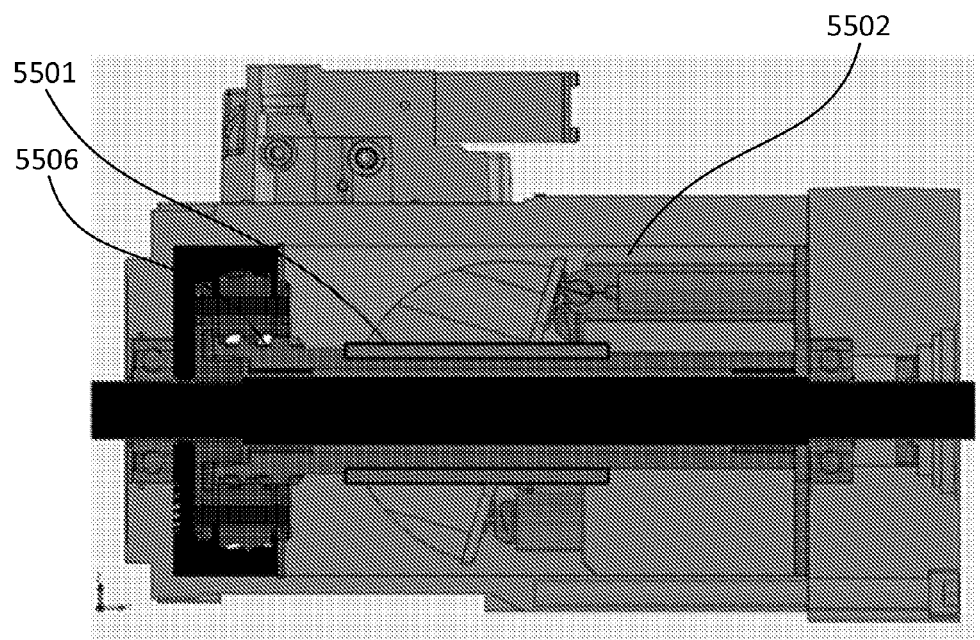
FIG. 27 illustrates a cross section of an integrated system that is comprised of a hydraulic pump/motor, an epicyclic gear train in which the pump/motor is connected to the sun gear, the ring gear is connected to a dog clutch that selectively connects it to the housing, and the planetary carrier is connected to the through-shaft, according to embodiments of the present invention.

FIG. 27 illustrates a system that uses a dog clutch 5501, which may include a synchronizer, to couple the sun gear 5506 to the cylinder block 5502, according to embodiments of the present invention.

Figures 28, 29:
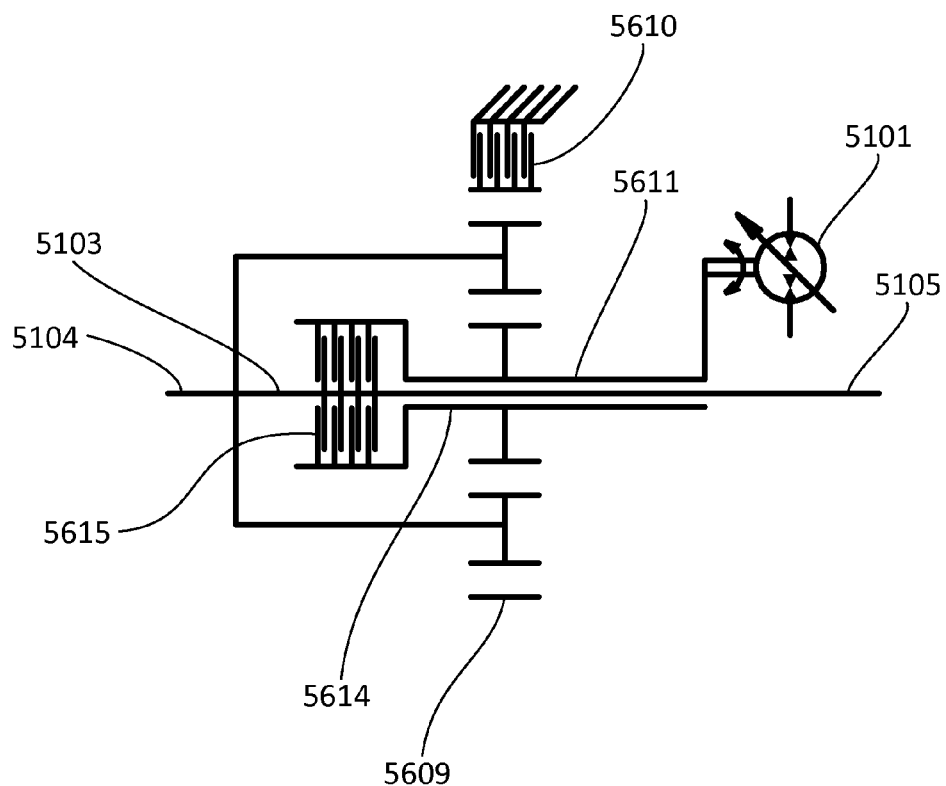
FIG. 28 illustrates a diagram of a system that is comprised of a hydraulic pump/motor, an epicyclic gear train in which the pump/motor is connected to, or is part of, the sun gear, the ring gear is connected to a clutch that can selectively connect the ring gear to ground, a planetary carrier that is connected to the through-shaft, and a second clutch that can selectively connect the sun gear and pump/motor to the through-shaft.
FIG. 29 illustrates a state diagram for the system of FIG. 15, according to embodiments of the present invention.

FIG. 28 illustrates a system that is comprised of two clutches that provide for multispeed gear box operation, according to embodiments of the present invention. In this embodiment, a first clutch 5610 is used to selectively provide a torque reaction to the ring gear 5609 such that a torque multiplication between the pump/motor 5101 and the shaft 5103 can be realized. During this mode of operation, a second clutch 5615 is released. In a second mode of operation the first clutch 5610 is released and the second clutch 5615 is applied thereby coupling the shaft 5103 to sun gear 5614, which is coupled to the pump/motor 5101 by connection 5611. When both of the clutches 5610, 5615 are released, no appreciable torque is transmitted between the pump/motor 5101 and the shaft 5103. The advantages of such a system include its ability to be used for a wider range of vehicle speeds.

FIG. 29 is a state diagram for the system described with respect to FIG. 28.

Figures 30, 31:
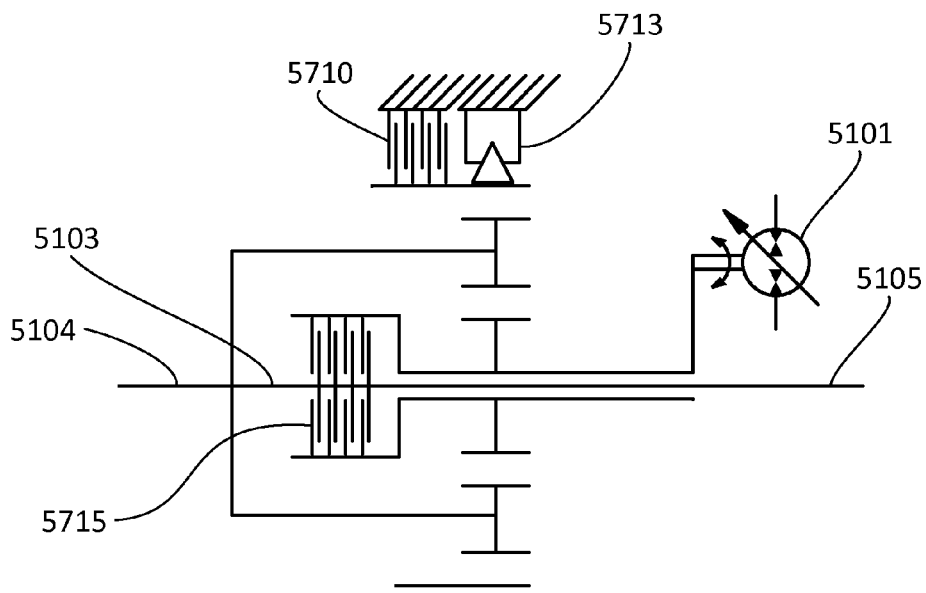
FIG. 30 illustrates a diagram of a system that is comprised of a hydraulic pump/motor, an epicyclic gear train in which the pump/motor is connected to, or is part of, the sun gear, the ring gear is connected to both a clutch that can selectively connect the ring gear to ground and a one way clutch that allows the ring to rotate in a single direction, a planetary carrier that is connected to the through-shaft and a second clutch that can selectively connect the sun gear and pump/motor to the through-shaft.
FIG. 31 illustrates a state diagram for the system of FIG. 30, according to embodiments of the present invention.

FIG. 30 illustrates an embodiment of the present invention that is comprised of two clutches and a one-way clutch. Similar to the system described with respect to FIG. 28, the system of FIG. 30 provides for multi speed operation. The addition of the one way clutch 5713 constrains the ring gear to rotate in one direction. In one mode of operation the system is started with clutch 5710 disengaged. If torque is being generated by the pump/motor that will tend to assist the vehicle acceleration, there will be a torque reaction against the one way clutch that will prevent the ring from rotating.

When it is desired to reduce the pump/motor 5101 speed by operating the gearbox in a direct drive mode, this can be accomplished by simply applying the second clutch 5715 and the one way clutch will allow the ring gear to rotate in the same direction as the input. Similarly, if the system speed is being reduced and it is desired to operate the system with a reduction gear ratio, then the second clutch 5715 can simply be released and the one way clutch will reengage as the ring gear tries to rotate in the other direction. Such a configuration makes shifts up and down much simpler and consequently of higher quality feel in most cases.

If it is desired to operate the system in the reduction ratio and absorb power from the vehicle, the first clutch 5710 may be applied in parallel to the one way clutch 5713. This permits reversal of torque, to permit the pump/motor to be used to absorb power from the vehicle.

FIG. 31 is a state diagram for the system of FIG. 30.

Figure 32:
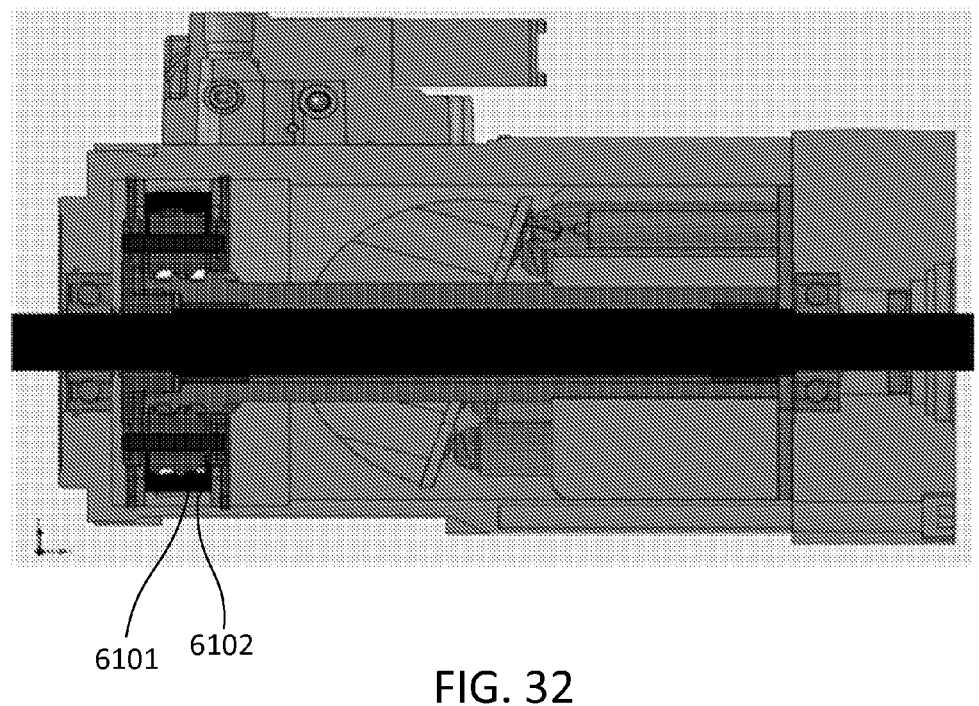
FIG. 32 illustrates a cross-sectional view of a another system that is comprised of a hydraulic pump/motor, an epicyclic gear train in which the pump/motor is connected to, or is part of, the sun gear, the ring gear is connected to a band brake that can selectively connect the ring gear to ground, and a planetary carrier that is connected to the throughshaft, according to embodiments of the present invention.

FIG. 32 illustrates a cross-sectional view of a system in which a band brake 6102 is used to prevent the ring gear 6101 from rotating appreciably relative to the housing, according to embodiments of the present invention. A band brake may also be used in any of the other systems described herein, to substantially prevent an element of the gear train from rotating relative to the housing.

Figure 33:
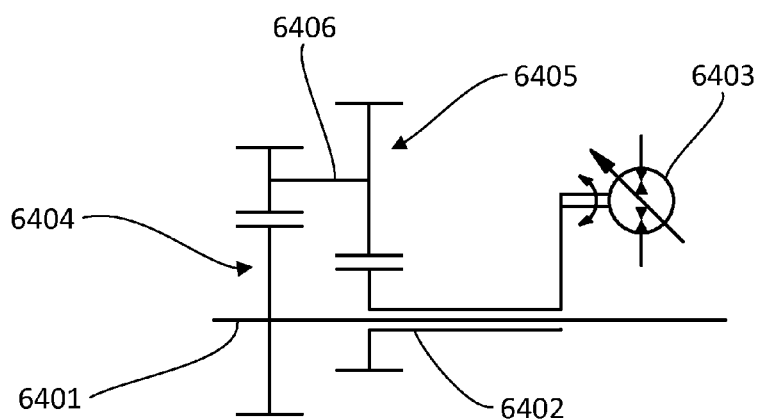
FIG. 33 illustrates a diagram of a system that is comprised of a hydraulic pump/motor and spur or helical gear train in which the pump/motor is connected to the through-shaft with the gear train, according to embodiments of the present invention.

There are other gear train types, and power transmitting devices, that can be used to modify the torque and speed of the pump/motor before it is connected to the shaft. FIG. 33 illustrates an embodiment according to which a pair of spur or helical gears are used to connect the pump/motor 6403 with the shaft 6401. Based on the disclosure provided herein, one of ordinary skill in the art will appreciate the many different combinations of types of gears used, numbers of gears used, sizes and pitches of the gears used and combinations of how the gears may be arranged, and those shown and discussed herein are exemplary and non-limiting.

One or more of the gear sets may be replaced with belts or chains and sprockets or pulleys. Examples include, but are not limited to, chains used in front wheel drive automatic transmission or transfer case, one non-limiting example being the "Silent Chain" product made by Ramesy, or the Poly chain GT carbon belts made by Gates. Various embodiments of the present invention use different combinations of gears, belts, chains, and other devices to comprise the "gear train." Based on the present disclosure, one of ordinary skill in the art will recognize the wide variety of different gear types and arrangements and combinations with other power transmitting devices that may be used, and those shown and discussed herein are exemplary and non-limiting.

According to some embodiments of the present invention, the system can be designed such that it can readily couple to the output of a transmission or transfer case. This functionality includes significant packaging advantages and may eliminate the need for one driveshaft. The housing according to some embodiments of the present invention may be configured to interface with a transmission or transfer case and bolt directly to it, for example.

According to embodiments of the present invention, the pump/motor 5101 is constructed with components from a Linde HPV-135 pump/motor and the epicyclic gear train 102 is from an automotive transmission, such as a Turbo-Hydramatic THM-350. The housing is made from a combination of cast iron and other parts machined from steel billet. The through-shaft is approximately 2.00 inches in diameter and made of gear and shaft grade steels such as 8620 and may be heat treated or carburized, according to such embodiments.

Although embodiments of the present invention are described herein with respect to hybrid vehicles, one of ordinary skill in the art, based on the present disclosure, will appreciate that such embodiments find application in other fields beyond the field of hybrid vehicles.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the appended claims, together with all equivalents thereof.

What is claimed is:

1. A system for hydraulic hybridization of a motor vehicle, the system comprising:
   a planetary gear mechanism comprising a first planetary member, a second planetary member, at least one planet gear, and a third planetary member, wherein one of the first, second, and third planetary members is a sun gear, wherein one of the first, second, and third planetary members is a ring gear, and wherein one of the first, second, and third planetary members is a carrier;
   an engine, the engine comprising a crank shaft;
   a transmission, the transmission comprising a transmission input shaft; and
   a hydraulic pump/motor, the hydraulic pump/motor comprising a pump shaft;
   wherein the first planetary member is mechanically coupled to the pump shaft, such that rotation of the first planetary member rotates the pump shaft and rotation of the pump shaft rotates the first planetary member, wherein the second planetary member is mechanically coupled to the crank shaft, such that rotation of the crank shaft rotates the second planetary member, and wherein the third planetary member is mechanically coupled to the transmission input shaft, such that rotation of the third planetary member rotates the transmission input shaft;
   wherein the hydraulic pump/motor is part of a parallel hydraulic hybrid system.

2. The system of claim 1, wherein the first planetary member is the sun gear, the second planetary member is the ring gear, and the third planetary member is the carrier.

3. The system of claim 1, further comprising a clutching mechanism configured to selectively couple two or more planetary members of the first, second, and third planetary members, such that the first, second, and third planetary members rotate at a common angular velocity.

4. The system of claim 3, wherein the clutching mechanism is configured to at least partially uncouple the two or more planetary members during a transmission gear shift.

5. The system of claim 4, wherein during the transmission gear shift the system is further configured to control one or both of a displacement of the hydraulic pump/motor and a size of a restriction on an output of the hydraulic pump/motor.

6. The system of claim 3, wherein the clutching mechanism is configured to at least partially couple the two or more planetary members to permit the crank shaft to directly drive the transmission input shaft.

7. The system of claim 6, wherein the system is configured to use the hydraulic pump/motor to add energy to or subtract energy from the motor vehicle.

8. The system of claim 1, wherein the planetary gear mechanism is at least partially mounted on a housing, the system further comprising a clutching mechanism configured to selectively couple one of the first, second, and third planetary members with the housing.

9. The system of claim 1, wherein the planetary gear mechanism is at least partially mounted on a housing, the system further comprising a clutching mechanism configured to selectively couple one of the first, second, and third planetary members with the housing to permit one-way rotation of the one planetary member with respect to the housing.

10. The system of claim 9, wherein the clutching mechanism is configured to selectively couple the first planetary member with the housing to permit one-way rotation of the first planetary member with respect to the housing, and wherein the system is configured to engage the clutching mechanism at least during a transition from a launch mode to a low gear mode in order to prevent rotation of the first planetary member from changing directions.

11. The system of claim 1, further comprising a clutching mechanism configured to selectively couple the pump shaft with the first planetary member.

12. The system of claim 11, wherein the first planetary member is the sun gear.

13. The system of claim 1, further comprising a damper between the crank shaft and the planetary gear mechanism.

14. The system of claim 1, further comprising a damper between the planetary gear mechanism and the transmission input shaft.

15. The system of claim 1, wherein the system is adapted to enter a launch mode in which the pump/motor is at a nonzero displacement and pumps fluid from a low pressure side to a high pressure side while an output on the high pressure side is restricted to raise a pressure on the high pressure side.

16. The system of claim 15, wherein in the launch mode, a first torque created by a pressure difference between the high pressure side and the low pressure side results in a second torque on the transmission input shaft.

17. The system of claim 1, further comprising an accumulator in fluid communication with the hydraulic pump/motor, wherein the system is adapted to start the engine using high pressure fluid from the accumulator.

18. The system of claim 1, wherein the system is adapted to enter an idle mode in which the crank shaft turns at a nonzero angular velocity and the transmission input shaft has zero angular velocity.

19. The system of claim 1, wherein the system is adapted to enter a low gear mode in which the first planetary member is prevented from rotating in at least one direction to create a torque multiplication between the crank shaft and the transmission input shaft.

20. The system of claim 19, further comprising a clutching mechanism, wherein the clutching mechanism is configured to prevent the first planetary member from rotating in the at least one direction.

21. The system of claim 19, further comprising a flow control device configured to substantially block an output flow of the pump/motor to substantially inhibit rotation of the first planetary member.

22. The system of claim 1, wherein the system does not include a hydrodynamic torque converter assembly.

23. The system of claim 1, wherein the system is adapted to enter a neutral with hydraulic supply mode in which the transmission input shaft is substantially inhibited from rotating, and rotation of the crank shaft rotates the pump shaft to produce hydraulic power.

24. The system of claim 1, wherein the hydraulic pump/motor is a first hydraulic pump/motor, the system further comprising a second hydraulic pump/motor that is also part of the parallel hydraulic hybrid system.

25. The system of claim 1, wherein the hydraulic pump/motor comprises two or more pump/motors.

26. A system for hydraulic hybridization of a motor vehicle, the system comprising:
   a planetary gear mechanism comprising a first planetary member, a second planetary member, at least one planet gear, and a third planetary member, wherein one of the first, second, and third planetary members is a sun gear, wherein one of the first, second, and third planetary members is a ring gear, and wherein one of the first, second, and third planetary members is a carrier;
   an engine, the engine comprising a crank shaft;
   a transmission; and
   a hydraulic pump/motor, the hydraulic pump/motor comprising a pump shaft;
   wherein the first planetary member is mechanically coupled to the pump shaft, such that rotation of the first planetary member rotates the pump shaft and rotation of the pump shaft rotates the first planetary member, wherein the second planetary member is mechanically coupled to the crank shaft, such that rotation of the crank shaft rotates the second planetary member, and wherein the third planetary member is at least a portion of the transmission;
   wherein the hydraulic pump/motor is part of a parallel hydraulic hybrid system.

27. A system for hydraulic hybridization of a motor vehicle, the motor vehicle having an engine with a crank shaft, and a transmission with a transmission input shaft, the system comprising:
   a planetary gear mechanism comprising a first planetary member, a second planetary member, at least one planet gear, and a third planetary member, wherein one of the first, second, and third planetary members is a sun gear, wherein one of the first, second, and third planetary members is a ring gear, and wherein one of the first, second, and third planetary members is a carrier;
   a hydraulic pump/motor, the hydraulic pump/motor comprising a pump shaft;
   wherein the first planetary member is mechanically coupled to the pump shaft, such that rotation of the first planetary member rotates the pump shaft and rotation of the pump shaft rotates the first planetary member, wherein the second planetary member is configured for mechanical coupling to the crank shaft, such that rotation of the crank shaft rotates the second planetary member, and wherein the third planetary member is configured for mechanical coupling to the transmission input shaft, such that rotation of the third planetary member rotates the transmission input shaft;
   wherein the hydraulic pump/motor is part of a parallel hydraulic hybrid system.

\* \* \* \* \*